United States Patent
Yount et al.

(10) Patent No.: US 12,032,934 B2
(45) Date of Patent: Jul. 9, 2024

(54) METHODS AND APPARATUS TO PERFORM AUTOMATIC COMPILER OPTIMIZATION TO ENABLE STREAMING-STORE GENERATION FOR UNALIGNED CONTIGUOUS WRITE ACCESS

(71) Applicant: Intel Corporation, Santa Clara, CA (US)

(72) Inventors: Charles Yount, Phoenix, AZ (US); Rakesh Krishnaiyer, Milpitas, CA (US); Timothy Creech, Silver Spring, MD (US); Daniel Woodworth, Hudson, MA (US); Joshua Cranmer, Hudson, MA (US)

(73) Assignee: Intel Corporation, Santa Clara, CA (US)

( * ) Notice: Subject to any disclaimer, the term of this patent is extended or adjusted under 35 U.S.C. 154(b) by 253 days.

(21) Appl. No.: 17/483,459

(22) Filed: Sep. 23, 2021

(65) Prior Publication Data
US 2022/0012028 A1    Jan. 13, 2022

Related U.S. Application Data

(60) Provisional application No. 63/119,640, filed on Nov. 30, 2020.

(51) Int. Cl.
*G06F 8/41* (2018.01)
(52) U.S. Cl.
CPC .................. *G06F 8/4434* (2013.01)
(58) Field of Classification Search
CPC ....... G06F 8/443; G06F 8/4434; G06F 8/4441
See application file for complete search history.

(56) References Cited

U.S. PATENT DOCUMENTS

| | | | |
|---|---|---|---|
| 7,386,842 B2 * | 6/2008 | Eichenberger | G06F 8/4452 717/160 |
| 8,171,464 B2 * | 5/2012 | Eichenberger | G06F 8/4441 717/160 |

(Continued)

OTHER PUBLICATIONS

Krishnaiyer, Rakesh, et al. "Compiler-based data prefetching and streaming non-temporal store generation for the intel (r) xeon phi (tm) coprocessor." 2013 IEEE International Symposium on Parallel & Distributed Processing, Workshops and Phd Forum. IEEE, 2013. (Year: 2013).*

(Continued)

*Primary Examiner* — Matthew J Brophy
(74) *Attorney, Agent, or Firm* — Hanley, Flight and Zimmerman, LLC

(57) ABSTRACT

Methods, apparatus, systems and articles of manufacture (e.g., computer readable storage media) to perform automatic compiler optimization to enable streaming-store generation for unaligned contiguous write access are disclosed. Example apparatus disclosed herein are to mark a store instruction in source program code as a transformation candidate when the store instruction is associated with a group of memory accesses that are unaligned with respect to a size of a cache line in a cache. Disclosed apparatus are also to transform the store instruction that is marked as the transformation candidate to form transformed program code when a non-temporal property is satisfied, the transformed program code to replace the store instruction with (i) a write to a buffer in the cache and (ii) a streaming-store instruction that is to write contents of the buffer to memory.

25 Claims, 20 Drawing Sheets

(56) References Cited

U.S. PATENT DOCUMENTS

| | | | | |
|---|---|---|---|---|
| 8,341,615 | B2* | 12/2012 | Eichenberger | G06F 8/456<br>718/107 |
| 9,921,966 | B2* | 3/2018 | Krishnaiyer | G06F 12/0862 |
| 2005/0283769 | A1* | 12/2005 | Eichenberger | G06F 8/4452<br>717/151 |
| 2007/0011441 | A1* | 1/2007 | Eichenberger | G06F 9/30036<br>712/221 |
| 2008/0201699 | A1* | 8/2008 | Eichenberger | G06F 8/4452<br>717/161 |
| 2010/0011339 | A1* | 1/2010 | Eichenberger | G06F 8/456<br>717/106 |
| 2013/0125097 | A1* | 5/2013 | Ebcioglu | G06F 30/323<br>717/136 |
| 2015/0324292 | A1* | 11/2015 | Krishnaiyer | G06F 12/0862<br>711/137 |
| 2021/0349823 | A1* | 11/2021 | Karm | G06F 12/0842 |

OTHER PUBLICATIONS

European Patent Office, "Extended European Search Report" mailed on Apr. 21, 2022, in related EP Application No. 21205038.9, 10 pages.

Krishnaiyer, R. et al. "Compiler-based Data Prefetching and Streaming Non-temporal Store Generation for the Intel® Xeon PhiTM Coprocessor", 2013, IEEE 27th International Symposium on Parallel & Distributed Processing Workshops and PhD Forum, pp. 1575-1586.

Eichenberger, A. et al. "Vectorization for SIMD Architectures with Alignment Constraints", ACM Sigplan Notices, Association for Computing Machinery, vol. 39, No. 6, Jun. 2004, pp. 82-93.

Bik, A. et al. "A Case Study on Compiler Optimizations for the Intel® CoreTM 2 Duo Processor", Int J Parallel Prog (2008) 36:571-591.

European Patent Office, "Communication Under Rule 71(3) EPC," issued in connection with European Patent Application No. 21205038.9, dated Dec. 12, 2023, 78 pages.

\* cited by examiner

400 ⟶

```
void store_example(const double * restrict src, double * restrict dst) {
  for (int i = 0; i < SIZE; i++) {
    if (src[i + 2 * SIZE] == 0) {
      dst[i] = src[i] + src[i + 1 + SIZE];
      dst[i + 1 + SIZE] = src[i - 1 + SIZE];
    } else {
      dst[i] = src[i] + src[i - 1 + SIZE];
      dst[i + 1 + SIZE] = src[i] + src[i + 1 + SIZE];
    }
  }
}
```

```
// Non-vectorizable loop
for (int i=0; i<n; i++) {
    a[i] = c[i]*b[i];

if (c[i] > b[i]) {
        // This call makes the loop non-vectorizable
        Rarely_executed_long_compute();
    }
}
```

```
void foo(float* restrict arr2, float* restrict b, float* restrict c, int N)
{
  int i;
  int j = 0;
  for (i = 0; i < N; i++) {
    if (b[i]){
      arr2[j++] = c[i];
    }
  }
}
```

```
void simple_triad(double * restrict a, double * restrict b, double * restrict c, double *d, int n)
{
   for (int i=0; i<n; i++)
     a[i] = c[i]*b[i];
}
``` gets transformed into the following form after loop-vectorization and unrolling. This is the (vectorized) form of the IR that becomes an input to the proposed non-temporal store transformation discussed in this proposal:

```
void simple_triad(double * restrict a, double * restrict b, double * restrict c, double *d, int n)
{
   for (int i1=0; i<n; i+=8) {     // Loop vectorized by 4 and then unrolled by 2
     a[i1] = c[i1]*b[i1];            // Vectorized loads and store with a vec-length of 4
     a[i1+4] = c[i1+4]*b[i1+4]; // Vectorized loads and store with a vec-length of 4
   }
}
```

```
typedef struct {
   float x, y, z;
} pos_struct;

void foo1(int n1, pos_struct * a1)
{
    int i;
    for (i=0; i<n1; i++) {
       a1[i].x = compute_x(i);
       a1[i].y = compute_y(i);
       a1[i].z = compute_z(i);
    }
}
```

```
void store_example(const double * restrict src, double * restrict dst) {
  for (int i = 0; i < SIZE; i += 8) {
    __m512d src0 = _mm512_loadu_pd(src + i);
    __m512d src1 = _mm512_loadu_pd(src + i + 1 + SIZE);
    __m512d src2 = _mm512_loadu_pd(src + i - 1 + SIZE);

__mmask8 cmp = _mm512_cmp_pd_mask(_mm512_loadu_pd(src + i + 2 * SIZE),

_mm512_setzero_pd(), _CMP_EQ_OQ);

__m512d dst0 = _mm512_mask_blend_pd(cmp,

_mm512_add_pd(src0, src2),

_mm512_add_pd(src0, src1));

__m512d dst1 = _mm512_mask_blend_pd(cmp, _mm512_add_pd(src0, src1), src2);

// Since dst + i is aligned, it can be converted to a streaming store immediately // as part of vectorization.

_mm512_stream_pd(dst + i, dst0);

// Second vector store remains unaligned after vectorization

// Candidate for new transform

_mm512_storeu_pd(dst + i + 1 + SIZE, dst1);

```
        #pragma omp target teams distribute parallel for collapse(3) private(k,j,n,m)
        for (k = 1; k <= gp22; k++) {
           for (j = 1; j <= gp12; j++) {
              for (n = 0; n < 5; n++) {
        #pragma omp simd
                 for (m = 0; m < 5; m++){
                    lhsX[m][n][0][0][j][k] = 0.0;
                    lhsX[m][n][1][0][j][k] = 0.0;
                    lhsX[m][n][2][0][j][k] = 0.0;
                    lhsX[m][n][0][isize][j][k] = 0.0;
                    lhsX[m][n][1][isize][j][k] = 0.0;
                    lhsX[m][n][2][isize][j][k] = 0.0;
                 }
              }
           }
        }
```

┌─────────────────────────────┐
│ struct misalign_info {      │
│   __m512d recirc_buffer;    │─── 1005
│   size_t recirc_count;      │
│   size_t misalign;          │
│   void *dst;                │
│ };                          │
└─────────────────────────────┘ void store_example(const double * restrict src, double * restrict dst) {    ── 1010
┌──────────────────────────────────────────────────────────────────────────────┐
│   size_t misalign = (size_t)(dst + 1 + SIZE) & 63; // Get the misalignment in bytes │
│   struct misalign_info misaligned_dst1 = {                                   │
│     .recirc_buffer = _mm512_setzero_pd(),                                    │
│     .misalign = misalign,                                                    │
│     .dst = dst + 1 + SIZE,                                                   │
│     .recirc_count = 0;                                                       │
│   };                                                                         │
│   __m512d store_buffer[STORE_BUFFER_SIZE];//typical value of STORE_BUFFER_SIZE is 128 or 256 │
│   int store_index_count = 0;                                                 │
└──────────────────────────────────────────────────────────────────────────────┘
  for (int i = 0; i < SIZE; i += 8) {
    __m512d src0 = _mm512_loadu_pd(src + i);
    __m512d src1 = _mm512_loadu_pd(src + i + 1 + SIZE);
    __m512d src2 = _mm512_loadu_pd(src + i - 1 + SIZE);

__mmask8 cmp = _mm512_cmp_pd_mask(_mm512_loadu_pd(src + i + 2 * SIZE),
                                     _mm512_setzero_pd(), _CMP_EQ_OQ);

__m512d dst0 = _mm512_mask_blend_pd(cmp,
                                        _mm512_add_pd(src0, src2),
                                        _mm512_add_pd(src0, src1));

__m512d dst1 = _mm512_mask_blend_pd(cmp, _mm512_add_pd(src0, src1), src2);

_mm512_stream_pd(dst + i, dst0);                                       ── 1015
┌──────────────────────────────────────────────────────────────────────────────┐
│   store_buffer[store_index_count++] = dst1;                                  │
│   if (store_index_count == STORE_BUFFER_SIZE) {                              │
│     store_unaligned_streaming(&misaligned_dst1, store_buffer, sizeof(store_buffer), 0); │
│     store_index_count = 0;                                                   │
│   }                                                                          │
└──────────────────────────────────────────────────────────────────────────────┘
  }
}
```

FIG. 10A

```
store_unaligned_streaming(&misaligned_dst1, store_buffer, store_index_count * 8, 1);
  _mm_sfence();
}

// This may be implemented as a library function
void store_unaligned_streaming(struct misalign_info *info, char *buffer, size_t size,
int final) {
  if (size < 64) {
    if (info->recirc_count > 0)
      memcpy(info->dst, &info->recirc_buffer, info->recirc_count);
    memcpy(info->dst + info->recirc_count, buffer, size);
    return;
  }
  if (info->misalign > 0) {
    memcpy(info->dst, buffer, 64 - info->misalign);
    info->dst += 64 - info->misalign;
    buffer += 64 - info->misalign;
    size -= info->misalign;
    info->misalign = 0;
  }
  if (info->recirc_count > 0) {
    memcpy((char*)&info->recirc_buffer + recirc_count, buffer, 64 - recirc_count);
    _mm512_stream_pd(info->dst, info->recirc_buffer);
    info->dst += 64;
    info->recirc_count = 0;
    size -= 64 - info->recirc_count;
    buffer += 64 - info->recic_buffer;
  }
  while (size >= 64) {
    _mm512_stream_pd(info->dst, _mm512_loadu_pd(buffer));
    info->dst += 64;
    buffer += 64;
    size -= 64;
  }
  if (size > 0) {
    memcpy(final ? info->dst : &info->recirc_buffer, buffer, size);
    info->recirc_count = size;
  }
}
```

```
void store_example(const double * restrict src, double * restrict dst) {
    // The misalignment must be statically known.                                    ⎫
    // (Measure misalign in number of doubles, not number of bytes).                 ⎬ 1105
    constexpr size_t misalign = ((1 + SIZE) & 63) / 8;                               ⎪
                                                                                     ⎪
    double *aligned_dst = dst + 1 + SIZE - misalign;                                 ⎪
    __m512d recirc_buffer = _mm512_loadu_pd(dst - 8);                                ⎭ for (int i = 0; i < SIZE; i += 8) {
        __m512d src0 = _mm512_loadu_pd(src + i);
        __m512d src1 = _mm512_loadu_pd(src + i + 1 + SIZE);
        __m512d src2 = _mm512_loadu_pd(src + i - 1 + SIZE);

__mmask8 cmp = _mm512_cmp_pd_mask(_mm512_loadu_pd(src + i + 2 * SIZE),
                                          _mm512_setzero_pd(), _CMP_EQ_OQ);

__m512d dst0 = _mm512_mask_blend_pd(cmp,
                                            _mm512_add_pd(src0, src2),
                                            _mm512_add_pd(src0, src1));

__m512d dst1 = _mm512_mask_blend_pd(cmp, _mm512_add_pd(src0, src1), src2);

_mm512_stream_pd(dst + i, dst0);

// Write to dst + i + 1 + SIZE instead uses a static realignment:            ⎫
        __m512d write_val = _mm512_alignr_pd(dst1, recirc_buffer, 8 - misalign);     ⎬ 1110
        _mm512_stream_pd(aligned_dst, write_val);                                    ⎪
        aligned_dst += 8;                                                            ⎪
        recirc_buffer = dst1;                                                        ⎭
    }

__m512d final_val = _mm512_alignr_pd(_mm512_loadu_pd(dst + 1 + 2 * SIZE), recirc_buffer,   ⎫
                                         8 - misalign);                                        ⎬ 1115
    _mm512_stream_pd(aligned_dst, final_val);                                                  ⎪
    _mm_sfence();                                                                              ⎭
}
```

```
!DIR$ omp simd nontemporal
  do k=1,nz-1
    rhsu(k,1) = cs(1,ipn)*u(k  ,ipp1)+sn(1,ipn)*v(k  ,ipp1) - u(k,ipn)
    rhsu(k,2) = cs(2,ipn)*u(k  ,ipp2)+sn(2,ipn)*v(k  ,ipp2) - u(k,ipn)
    rhsu(k,3) = cs(3,ipn)*u(k  ,ipp3)+sn(3,ipn)*v(k  ,ipp3) - u(k,ipn)
    rhsu(k,4) = cs(5,ipn)*u(k  ,ipp5)+sn(5,ipn)*v(k  ,ipp5) - u(k,ipn)
    rhsu(k,5) = cs(2,ipn)*u(k+1,ipp2)+sn(2,ipn)*v(k+1,ipp2) - u(k,ipn)
    rhsu(k,6) = cs(3,ipn)*u(k+1,ipp3)+sn(3,ipn)*v(k+1,ipp3) - u(k,ipn)
    rhsu(k,7) = cs(4,ipn)*u(k+1,ipp4)+sn(4,ipn)*v(k+1,ipp4) - u(k,ipn)
    rhsu(k,8) = cs(n,ipn)*u(k+1,ippn)+sn(n,ipn)*v(k+1,ippn) - u(k,ipn)
    rhsu(k,9) = ca4k(k)*u(k,ipn)+ca4p(k)*u(k+1,ipn) - u(k,ipn)

rhsv(k,1) =-sn(1,ipn)*u(k  ,ipp1)+cs(1,ipn)*v(k  ,ipp1) - v(k,ipn)
    rhsv(k,2) =-sn(2,ipn)*u(k  ,ipp2)+cs(2,ipn)*v(k  ,ipp2) - v(k,ipn)
    rhsv(k,3) =-sn(3,ipn)*u(k  ,ipp3)+cs(3,ipn)*v(k  ,ipp3) - v(k,ipn)
    rhsv(k,4) =-sn(5,ipn)*u(k  ,ipp5)+cs(5,ipn)*v(k  ,ipp5) - v(k,ipn)
    rhsv(k,5) =-sn(2,ipn)*u(k+1,ipp2)+cs(2,ipn)*v(k+1,ipp2) - v(k,ipn)
    rhsv(k,6) =-sn(3,ipn)*u(k+1,ipp3)+cs(3,ipn)*v(k+1,ipp3) - v(k,ipn)
    rhsv(k,7) =-sn(4,ipn)*u(k+1,ipp4)+cs(4,ipn)*v(k+1,ipp4) - v(k,ipn)
    rhsv(k,8) =-sn(n,ipn)*u(k+1,ippn)+cs(n,ipn)*v(k+1,ippn) - v(k,ipn)
    rhsv(k,9) = ca4k(k)*v(k,ipn)+ca4p(k)*v(k+1,ipn) - v(k,ipn)
  enddo
```

```
      DO 100 J=1,N
      DO 100 I=1,M
      CU(I+1,J) = .5D0*(P(I+1,J)+P(I,J))*U(I+1,J)
      CV(I,J+1) = .5D0*(P(I,J+1)+P(I,J))*V(I,J+1)
      Z(I+1,J+1) = (FSDX*(V(I+1,J+1)-V(I,J+1))-FSDY*(U(I+1,J+1)
     1       -U(I+1,J)))/(P(I,J)+P(I+1,J)+P(I+1,J+1)+P(I,J+1))
      H(I,J) = P(I,J)+.25D0*(U(I+1,J)*U(I+1,J)+U(I,J)*U(I,J)
     1           +V(I,J+1)*V(I,J+1)+V(I,J)*V(I,J))
  100 CONTINUE
```

```
constexpr int M = 32;

for (int i = 0; i < N; ++i) {
  for (int j = 0; j < M; ++j) {
    A[j*N + i] = i+j;
  }
}
```

```
#pragma omp parallel for collapse(2) private(ix, iy, p)
for ( ix = startX; ix < endX; ix++) {
  for ( iy = startY; iy < endY; iy++) {
    site_i = ix*NY + iy;
...
    for( p = 0; p < NPOP; p++ ) {
...
      nxt[(p*NX*NY) + site_i] = ( Hermite0 + Hermite1 + Hermite2 * ( _02 ) +
                    Hermite3 * ( _06 ) + Hermite4 * ( _24 )
              ) * param->ww[p];
    }
  } // for iy
} // for ix
```

FIG. 25

METHODS AND APPARATUS TO PERFORM AUTOMATIC COMPILER OPTIMIZATION TO ENABLE STREAMING-STORE GENERATION FOR UNALIGNED CONTIGUOUS WRITE ACCESS

RELATED APPLICATION(S)

This patent claims the benefit of and priority from U.S. Provisional Patent Application No. 63/119,640, which is titled "METHODS AND APPARATUS TO PERFORM AUTOMATIC COMPILER OPTIMIZATION TO ENABLE STREAMING-STORE GENERATION FOR UNALIGNED CONTIGUOUS WRITE ACCESS," and which was filed on Nov. 30, 2020. U.S. Provisional Patent Application No. 63/119,640 is hereby incorporated by reference in its entirety.

FIELD OF THE DISCLOSURE

This disclosure relates generally to compilers, and, more particularly, to methods, apparatus, systems and articles of manufacture (e.g., computer readable storage media) to perform automatic compiler optimization to enable streaming-store generation for unaligned contiguous write access.

BACKGROUND

During operation, computing devices store data and instructions in memory and perform operations by accessing data stored in memory. The speed and performance of a computing device depends on how data and instructions are stored, as well as the amount of memory included in the computing device.

BRIEF DESCRIPTION OF THE DRAWINGS

FIG. 4 illustrates example program code to implement a store loop.

FIG. 5 illustrates example program code to implement a unit-stride memory access loop.

FIG. 6 illustrates example program code to access an example array of structures (AOS).

FIG. 7 illustrates example program code to implement a non-vectorizable loop with a store operation.

FIG. 8 illustrates example program code to implement a compress loop.

FIG. 9 illustrates example program code to implement a compiler transformation after vectorization.

FIGS. 10A and 10B illustrate example program code to implement a transformation phase supporting dynamic realignment.

FIG. 11 illustrates example program code to implement a transformation phase supporting static realignment.

FIG. 12 illustrates first example program code that can be compiled by the example compiler system of FIG. 1.

FIG. 13 illustrates second example program code that can be compiled by the example compiler system of FIG. 1.

FIG. 14 illustrates third example program code that can be compiled by the example compiler system of FIG. 1.

FIG. 15 illustrates fourth example program code that can be compiled by the example compiler system of FIG. 1.

FIG. 24 illustrates example program code to implement a loop nest with an inner loop that contains a store that is unit-strided with respect to an outer loop.

FIG. 25 illustrates fifth example program code that can be compiled by the example compiler system of FIG. 1.

Figure 1:
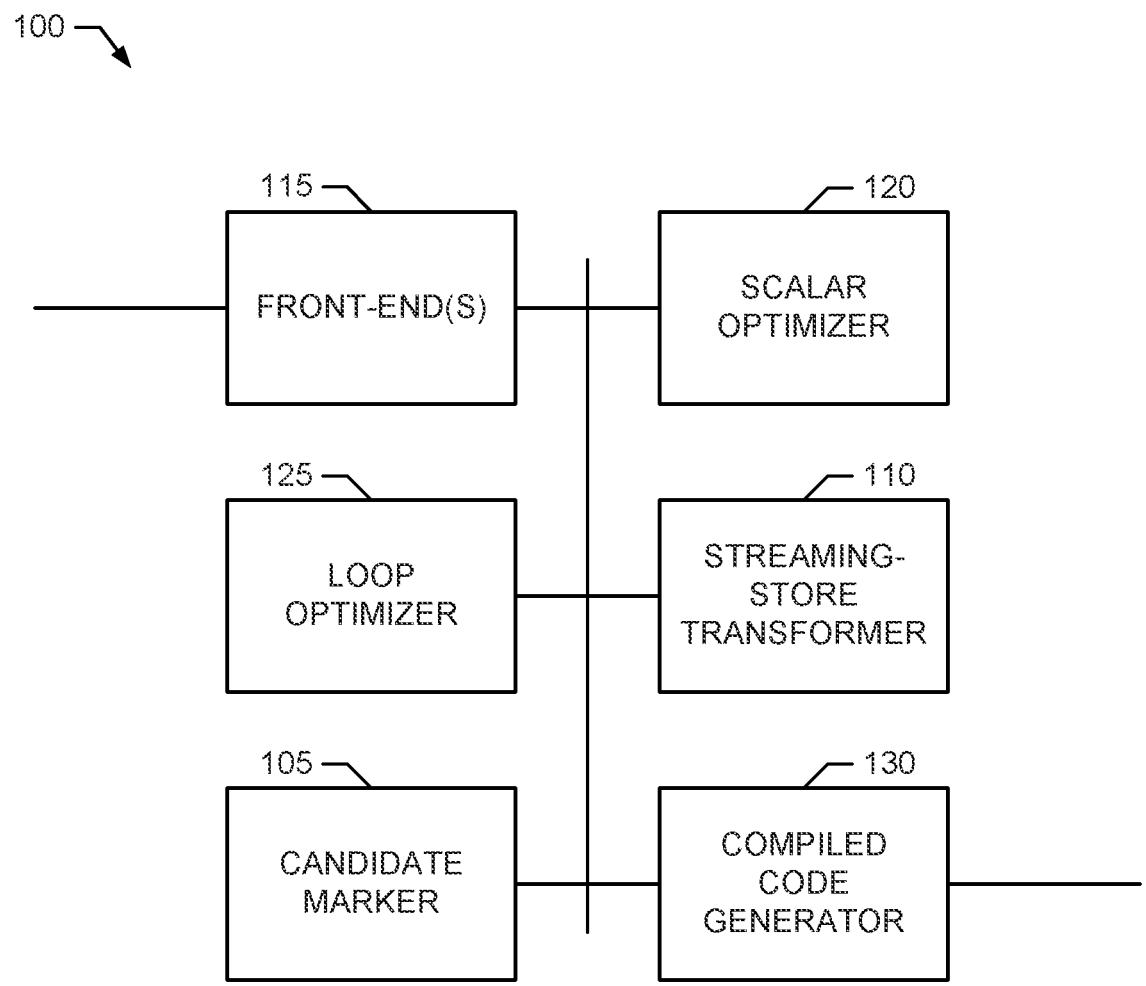
FIG. 1 is a block diagram of an example compiler system implemented in accordance with teachings of this disclosure.

The figures are not to scale. In general, the same reference numbers will be used throughout the drawing(s) and accompanying written description to refer to the same or like parts, elements, etc. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time +/−1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

Modern central processing unit (CPU) architectures utilize streaming-store instructions that write an entire cache-line to memory. Streaming-store operations save memory bandwidth by avoiding the read-for-ownership (RFO) transaction over the memory-bus. However, use of streaming-store instructions is typically limited to cases in which the data in an array to be written to memory is aligned at cache-line boundaries or vector-length boundaries. In practice, aligning data is difficult, and performance of the resulting application can be suboptimal. Absent the requisite alignment, conventional (non-streaming) storing operations are used to handle data operations. In some CPU architectures, conventional stores with RFO consume twice the bandwidth of streaming-stores.

Using streaming-stores can be difficult for several reasons. Streaming-stores may appear in a loop, which is a structure that repeats a sequence of instructions until a specific condition is met. The loop may have multiple array accesses that have different relative alignment such that it may not be possible to align all of them at the same time. (An array is a data structure consisting of a collection of elements (e.g., values or variables) each identified by at least one array index or key.) Also, loops can belong to a parallel region, for example, as specified by an OpenMP® construct that appears just before the loop. When the parallel construct is encountered, new threads are started and will continue execution until the parallel region for which they were started comes to an end. (A thread refers to a thread of execution, which is a way for a program to divide or "split" itself into two or more simultaneously (or pseudo-simultaneously) running tasks.) If the loop belongs to a parallel region, the alignment property (for each array on each thread) may depend on the work-partitioning done by the parallel runtime library (such as OpenMP® runtime), and the user (e.g., programmer) may not be able to guarantee alignment irrespective of the work-partitioning that is done. (Work-partitioning refers to a parallel computation loop that is separated into segments to divide resources so multiple tasks can be run on the same device simultaneously.) Such data alignment issues can reduce the applicability of streaming-store instructions for use in vector-loops and scalar-loops that store data.

In some cases, compilers can mitigate the above data alignment issues by performing some automatic optimizations to align the data accesses. For example, the compiler may implement dynamic peeling of vector-loops to align some memory references. Dynamic peeling of vector-loops refers to separating or, in other words, peeling a few iterations of the loop from the original loop initially, while aligning memory references associated with the remaining iterations of the loop. The vector-kernel loop that follows the peel loop can then take advantage of proper alignment for the array accesses that were targeted by the compiler and use non-temporal store instructions that deliver performance benefits in profitable cases. Because the compiler generates multiple versions of the kernel loop to handle such cases, this separating/peeling technique may be limited to a few (such as one or two) memory references per loop. If the loop has many memory references, this separating/peeling technique loses its efficiency (unless the compiler analysis can prove that multiple memory references have the same misalignment relative to a cache-line or vector-length boundary, which is not common). Moreover, this separating/peeling technique may be unable align memory accesses if arrays accessed together inside a loop have different relative alignment. Also, the dynamic peeling heuristics may prefer aligning some loads inside the loop. In such a case, there may be unaligned stores even for cases where there are only one or two stores inside the loop. If there are conditions inside the loop, and the same array elements get written under all conditions, then the compiler may be able to sink the store out of the if-else parts to the top-level of the loop-body, which can help generation of streaming-store instructions.

Note that a conventional compiler generally treats all memory accesses as unaligned by default, unless the compiler can prove that the memory accesses are aligned based on its own heuristics or based on hints from the user (e.g., programmer) via pragmas/directives/clauses that let the user convey alignment to the compiler. However, specifying such clauses may involve program restructuring, which can be a tedious process for real-life application programs. Also, even if the user is willing to provide all the hints, the compiler may still be unable to align all stores inside a loop if they have different relative alignment.

To address these and other potential issues that may hinder use of streaming-store instructions, disclosed example methods, apparatus, systems and articles of manufacture (e.g., computer readable storage media) perform automatic compiler optimization to enable streaming-store generation for unaligned contiguous write access. For example, disclosed example streaming-store optimized compilers facilitate an automated compiler transformation that identifies contiguous stores (e.g., each contiguous store)

in a source-code loop and automatically transforms an unaligned store (e.g., which can be in vectorized or scalar form) into a write to an intermediate buffer (e.g., which remains in cache) followed by subsequent writes to aligned memory locations from the buffer utilizing non-temporal streaming-store instructions that cover some or all of the stores that happen to an array. In some examples, the transformation also involves handling the first (as well as the last) few unaligned memory accesses in the loop through the use of regular store instructions.

Turning to the figures, a block diagram of an example compiler system 100 implemented in accordance with teachings of this disclosure is illustrated in FIG. 1. The compiler system 100 of FIG. 1 is also referred to as an example streaming-store optimized compiler system 100. The compiler system 100 of the illustrated example includes an example candidate marker 105 to identify and mark contiguous store operations in source program code that are candidates for transformation into transformed program code containing streaming-store instructions. As disclosed in further detail below, the example candidate marker 105 identifies and marks a store instruction in source program code as a transformation candidate when the store instruction is associated with a group of memory accesses that are unaligned with respect to a size of a cache line in a cache.

The compiler system 100 of the illustrated example also includes an example streaming-store transformer 110 that performs a transformation of a transformation candidate into transformed program code that includes writes to an intermediate buffer (e.g., in the cache) followed by subsequent streaming-store instructions to write the contents of the intermediate buffer to aligned memory locations in memory. In some examples, the streaming-store transformer 110 conditions the transformation of the transformation candidate on whether a non-temporal property is satisfied, as disclosed in further detail below.

The compiler system 100 of the illustrated example further includes one or more example front-ends 115, an example scalar optimizer 120, an example loop optimizer 125 and an example compiled code generator 130. Further implementation details concerning the candidate marker 105, the streaming-store transformer 110, the front-end(s) 115, the scalar optimizer 120, the loop optimizer 125 and the compiled code generator 130 are provided below.

In the illustrated example compiler system 100, the candidate marker 105, the streaming-store transformer 110, the front-end(s) 115, the scalar optimizer 120, the loop optimizer 125 and the compiled code generator 130 are depicted as being implemented by software executed by processor circuitry (e.g., one or more processors). However, in some examples, one or more of the candidate marker 105, the streaming-store transformer 110, the front-end(s) 115, the scalar optimizer 120, the loop optimizer 125 and/or the compiled code generator 130 may be implemented by hardware (e.g., circuitry), a combination of hardware (e.g., circuitry) and firmware, etc. In such examples, the candidate marker 105, the streaming-store transformer 110, the front-end(s) 115, the scalar optimizer 120, the loop optimizer 125 and/or the compiled code generator 130 may be referred to as example candidate marker circuitry 105, example streaming-store transformation circuitry 110, example front-end circuitry 115, example scalar optimization circuitry 120, example loop optimization circuitry 125 and/or example compiled code generation 130 circuitry, respectively.

Figure 2:
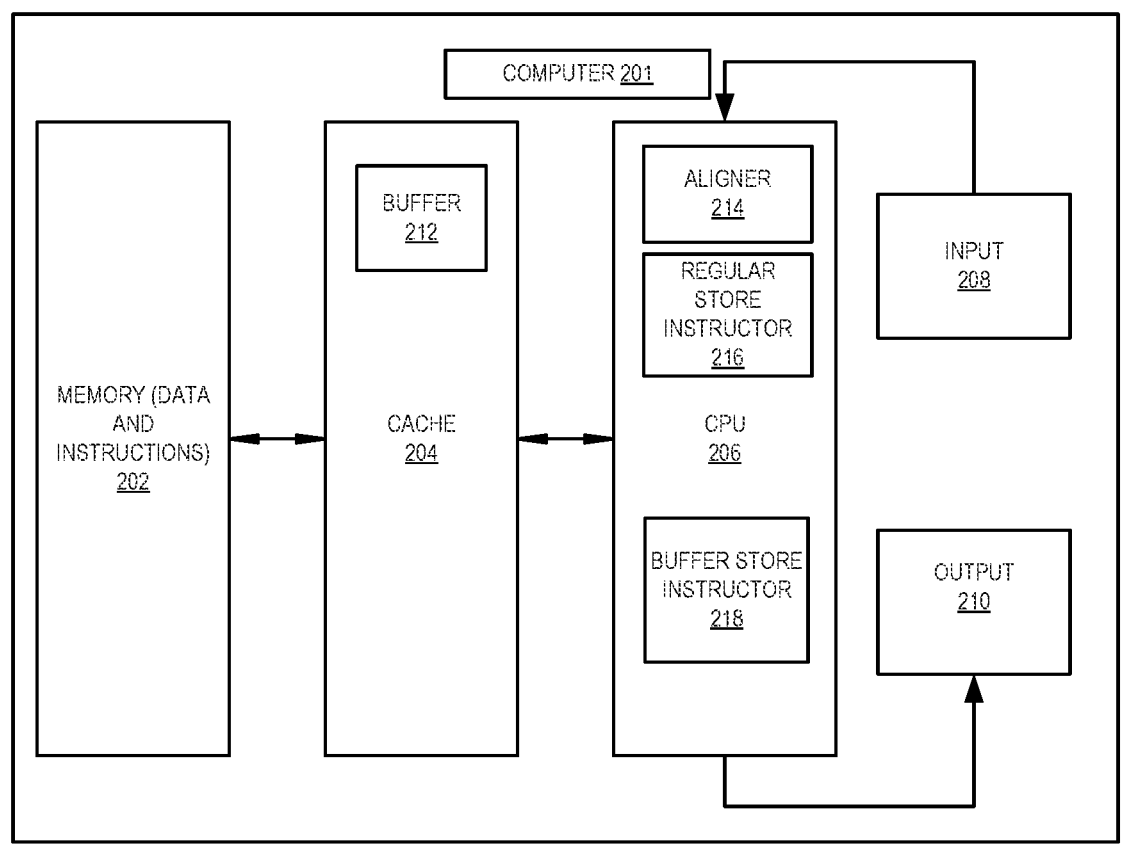
FIG. 2 is a block diagram of an example computer system structured to perform streaming-store operations in accordance with teachings of this disclosure.

FIG. 2 illustrates another example computer system 200 that is structured to perform streaming-store operations in accordance with teachings of this disclosure. The computer system 200 of the illustrated example includes example memory 202 to store data and program instructions, an example cache 204, an example central processing unit (CPU) 206, an example input 208, an example output 210, an example buffer 212, an example regular store instructor 216 and an example buffer store instructor 218. Further implementation details concerning the computer system 200 are provided below.

Figure 3A:
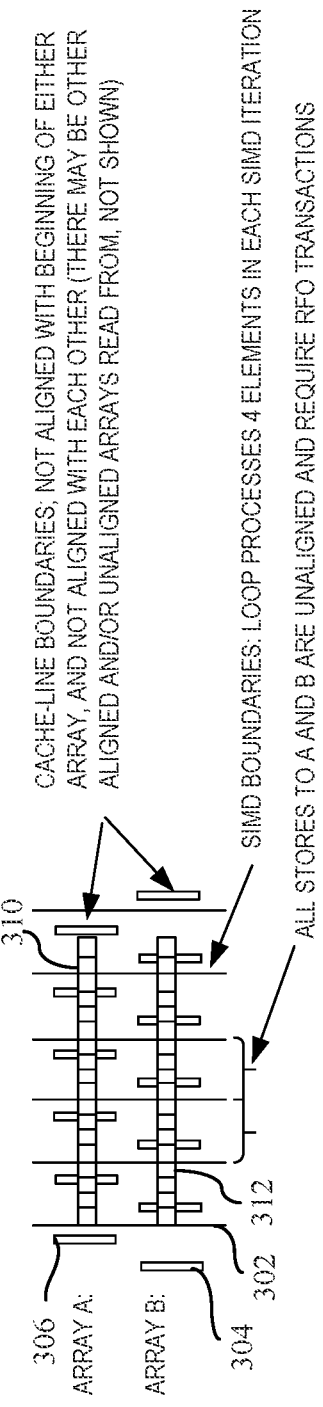
FIG. 3A is an example illustration of two unaligned data arrays associated with operation of a program loop.
Figure 3B:
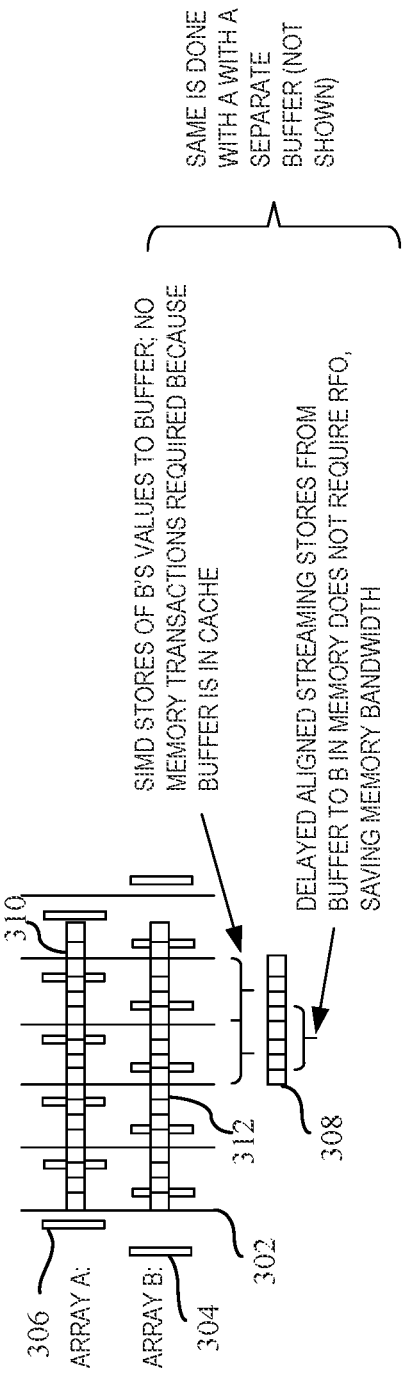
FIG. 3B is an example illustration showing transformation of one of the two unaligned data arrays of FIG. 3A in accordance with teachings of this disclosure.

As noted above, operation of the compiler system 100 is based on whether memory accesses (e.g., associated with an array) are considered to be aligned. Such alignment can come in two types, namely, global alignment and relative alignment. In some examples, global alignment concerns whether any given array originates at a memory address that is evenly divisible by the size of a cache-line. For example, if a cache-line size is 64 bytes, arrays that begin on memory addresses that are multiples of 64 (e.g., 0, 64, 128, 192, etc.) are considered to be globally aligned, and those that do not begin on memory addresses that are multiples of 64 are considered to not be globally aligned. This global alignment property is illustrated in FIG. 3A and FIG. 3B. In FIG. 3A and FIG. 3B, an example Array A 310 is not globally aligned because it does not originate at one of the addresses that is a multiple of the cache-line size, as indicated by the lines 306. Similarly, an example array B 312 is not globally aligned because it does not originate at one of the addresses that is a multiple of the cache-line size, indicated by the lines 304.

Relative alignment applies to the relative location of a pair of arrays. If both of two arrays are globally aligned, they are also relatively aligned. If neither of two arrays is globally aligned, and the two arrays originate at the same offset from multiples of the cache-line size, they are considered to be relatively aligned. If one or both of two arrays are not globally aligned, and the two arrays originate at different offsets from multiples of the cache-line size, they are considered to be not relatively aligned. This relative alignment property is also illustrated in FIG. 3A and FIG. 3B. In FIG. 3A and FIG. 3B, Array A 310 and Array B 312 are not relatively aligned with respect to each other, because Array A 310 originates one element beyond a cache-line multiple (corresponding to the leftmost line 306), and Array B 312 originates three elements beyond a cache-line multiple (corresponding to the leftmost line 304).

More specifically, FIG. 3A illustrates example arrays 310 and 312 associated with operation of a loop, such as a single instruction, multiple data (SIMD) loop with two unaligned (absolutely and relatively) write streams associated with the array A 310 and the array B 312. In the illustrated example, the cache-line boundaries 304 and 306 are not aligned with beginning of either array 310 or array 312, and array 310 and array 312 are not aligned relative to each other. Additionally, the example SIMD boundaries 302 indicate that the loop processes 4 elements in each SIMD loop iteration. Accordingly, in the example of FIG. 3A, all stores to the array A 310 and the array B 312 are unaligned and require RFO transactions for the information in these arrays to be written to memory.

FIG. 3B illustrates an example transformation performed by the compiler system 100 on the example SIMD loop of FIG. 3A. As a result of the transformation, values of array B 312 are written into an example cached buffer 308 and subsequently streamed to memory. The stores of the values of the array B 312 to the buffer 308 may involve no memory transactions because the buffer 308 is in cache. Then, delayed aligned streaming-stores are performed from buffer 308 to another array in memory, which does not require RFO, and saves memory bandwidth. This transformation in a SIMD loop may also be done for array A 310 with a separate buffer, which is not shown in the example of FIG. 3B.

In some examples, the compiler system 100 of FIG. 1 supports streaming-store based compilation of loops containing contiguous unaligned vector stores to output arrays (e.g., that are not loaded in the same loop nest or where the same array elements get loaded after the store such that the compiler can optimize away the load) where the total data accessed in the loop nest is large making the stores non-temporal. The non-temporal property implies that the data access pattern of the application is such that any later access to these output arrays in the application is distant and will involve bringing these values from memory (and, thus, will not benefit from caching).

In some examples, such loops can be vectorized by the example compiler system 100 by making use of different vector lengths based on compiler heuristics and user pragmas. In some examples, the loops may be unrolled by some factor after vectorization. In some examples, the loop may not be vectorized due to loop-carried dependences not involving such arrays (such as a loop-carried scalar dependence). In some examples, the example compiler system 100 supports detection of contiguous write access across all the store operations inside the loop for each array, irrespective of whether the loop is vectorized and/or unrolled.

In some examples, the compiler system 100 of FIG. 1 supports streaming-store based compilation of loops with contiguous unaligned scalar stores to output arrays (e.g., that are not loaded in the same loop nest) where the total data accessed in the loop nest is large, making non-temporal stores worthwhile. In some examples, the compiler system 100 of FIG. 1 supports streaming-store based compilation of loops where all fields of a data structure get written inside the loop, and the stores are non-temporal (such as in the example source code of FIG. 6, which is described in further detail below).

In some examples, the compiler system 100 of FIG. 1 supports streaming-store based compilation of loops with "compress" idiom (such as in the example source code of FIG. 8, which is described in further detail below) in which an array is stored inside the loop under a condition, such as in the following source code: "if (cond) out1[i++]=val."

In some examples, the compiler system 100 of FIG. 1 can check the non-temporality of accesses (e.g., based on the cache size and data accessed in the loop-nest) at runtime based on the actual trip-count values for the loops involved. This can make it easier for users (e.g., programmers) to transparently get benefits from streaming-store based transformation implemented by the compiler system 100 as the users do not have to individually mark the loops/memory-accesses that have the non-temporal property. If at runtime, the trip-count values are such that the number of accesses is too low to make non-temporal writes worthwhile, there will not be any degradation in performance since, in some examples, the code-path will skip generation of non-temporal store instructions in such cases.

In some examples, the compiler system 100 of FIG. 1 supports streaming-store based compilation of store accesses in an inner-loop or in an outer-loop.

In some examples, the compiler system 100 of FIG. 1 performs non-temporal analysis based on a loop-nest rather than just the innermost loop that may get vectorized. This pattern is common for multi-dimensional array accesses that are especially prevalent in Fortran (e.g., where the loops access almost the entire extent of the arrays in each dimension, but for some small margins). Even if the innermost vectorized loop spans just a few hundreds of cache-lines, if the total data accessed in the loop-nest is large, memory bandwidth can be reduced by causing the stores for the innermost vectorized loop to be done through non-temporal instructions, thus delivering an overall benefit.

In some examples, the compiler system 100 of FIG. 1 supports streaming-store based compilation of an inner loop of a loop nest where the inner loop has a small, fixed trip count that is known at compile time and contains a store that is unit-strided with respect to an outer loop (such as in the example source code of FIG. 24, which is described in further detail below). In some such examples, the compiler system 100 performs a streaming-store transformation on the store using multiple temporary buffers by treating the store as if it were multiple separate contiguous stores in the outer loop.

In some examples, the compiler system 100 of FIG. 1 also generates a memory-fence instruction following the entire loop-nest. Such a memory-fence instruction can ensure that memory-ordering constraints are satisfied for non-temporal store instructions before the stored memory values get accessed in any code following the loop-nest. For example, the compiler system 100 may add such memory-fence instruction when generating its transformed program code (e.g., its compiled code) for CPU architectures that require this instruction following non-temporal writes.

As such, streaming-store based compilation, as implemented by the example compiler system 100 of FIG. 1, may improve performance whenever the access to data is non-temporal, such as when the data accessed in the entire loop-nest exceeds the size of the cache or when such data is not going to be accessed soon after the loop-nest (e.g., as there may be no benefit from keeping the data in cache).

There are many practical applications, especially in the field of high-performance computing (HPC), where overall performance is limited by memory bandwidth. If such applications have loops where the contiguous write streams form a substantial percentage of the bandwidth consumption, streaming-store based compilation, as implemented by the example compiler system 100 of FIG. 1, can lead to significant gains. For example, in simple memory-copy access patterns with one input array and one output array, streaming-store based compilation, as disclosed herein, can lead to a 50% gain in performance (e.g., memory bandwidth consumption can reduce from three accesses per element to two due to avoidance of RFO).

In some examples, the compiler system 100 of FIG. 1 performs streaming-store based compilation of loops with streaming-store code transformations written in C, C++, or Fortran programs, optionally augmented by parallel annotations (e.g., such as those contained in the OpenMP® specifications). In some examples, the compiler system 100 implements streaming-store based compilation (and the associated streaming-store code transformations disclosed herein) as compiler optimizations at the intermediate representation (IR) level that affect single-threaded code. Thus, other high level languages and parallel frameworks (such as OpenACC, SYCL™, OpenCL™) can benefit from streaming-store based compilation as disclosed herein, either in a static compilation framework or in a just-in-time (JIT) compilation framework.

For some compute architectures, streaming store instructions (also referred to herein as streaming non-temporal store instructions, non-temporal store instructions, etc.) are specialized memory store instructions designed to save off-chip memory bandwidth in cases where data with no temporal locality is being streamed into memory. Unlike regular stores, such store instructions do not perform a read for ownership (RFO) for the target cache line before the actual store. The rationale behind this is that any data read from memory for this purpose will not be used and will get overwritten by the data stream.

In some examples, streaming non-temporal store instructions are vector instructions that operate on data whose length is equal to the vector-length. In some examples, there are only unmasked, aligned versions of these instructions. Therefore, use of such streaming-store instructions can be limited to cases in which the target store address is aligned to the vector-length (e.g., 16 bytes for Intel's® streaming SIMD extensions (SSE), 32 bytes for Intel's® advanced vector extensions (AVX), 64 bytes for Intel's® AVX-512, etc.) and the store operation is unmasked (e.g., such that the entire vector will be written, and not just a part of it). In some such examples, if the store is unaligned or masked, regular store instructions are used instead of the streaming non-temporal store instructions.

In some example compute devices, a streaming store instruction stores a full 16 B (16-byte) vector register to memory. In some examples, there is only a packed variant of this streaming store instruction, which means that the target address must be 16 B aligned in memory. Note that while the main memory interface may operate at a 64 B cache line granularity in some examples, the size of data being written using this streaming store instruction is only one fourth of a cache line. In some such examples, a micro-architecture implementation may use a hardware buffer to merge the streaming stores that fall into the same cache line and write them together to memory as a single operation. Since these stores bypass the cache hierarchy and get combined on a separate buffer, use of such stores may be limited to cases in which the accesses are non-temporal. In some examples, memory accesses are considered to be non-temporal when the next time the same memory locations are to be accessed (if at all) in the program is far later (in a temporal sense) and, thus, there is little to no benefit in keeping the stored data in the cache. It should also be the case that the memory locations that are the targets of the streaming store instructions are not loaded earlier in the same loop nest in the program. Otherwise, the RFO of the cache lines will happen anyway, thereby reducing or eliminating the profitability of the streaming stores. Similarly, the stored memory locations should not get prefetched as well, because that would lead to an RFO and negate the benefits from the transformation of the source code to utilize streaming store instructions, as disclosed herein.

The foregoing kinds of non-temporal write access patterns, for which the compiler system 100 of FIG. 1 can streaming-store based compilation and its associated transformation of the source code to utilize streaming store instructions. is common in many HPC applications. Further source code examples that exhibit these non-temporal write access patterns are illustrated in FIGS. 4-8.

FIG. 4 illustrates a source code example 400 that implements a store loop. The loop of the illustrated example has a trip-count of SIZE and there are two stores to the same destination array (dst) in each iteration. There is no overlap between the two stores across the entire loop since the relative offset-difference between the two stores is larger than the trip-count SIZE. If the original user algorithm had an array of data structures (where the structure has two data fields) and the user transformed this algorithm to use a structure of arrays (to get better memory locality), that would result in an access pattern similar to the example of FIG. 4. In the source code example 400, the same set of stores happens in both sides of the if-condition in every iteration.

FIG. 5 illustrates a source code example 500 that implements a unit-stride memory access loop. The unit-stride memory access loop of the illustrated example gets unrolled after vectorization. Here the contiguity analysis performed by the example compiler system 100 looks at all the stores inside the loop, and once a set of stores is identified that together ensure contiguity of memory access, a single temporary input buffer can be used to represent that set, from which non-temporal stores from that input buffer are performed every few iterations.

FIG. 6 illustrates a source code example 600 that implements an example of AOS (array of structures) access. In the illustrated example, the AOS access is such that all fields of the structure get written in every iteration of the loop. (Even if the structure is padded, the compiler can insert writes to the pad-field as part of this optimization to ensure contiguity) Here the contiguity analysis performed by the example compiler system 100 looks at all the stores inside the loop, and once a set of stores is identified that together ensure contiguous memory accesses, a single temporary input buffer can be used to represent that set, from which non-temporal stores from that input buffer are performed every few iterations.

FIG. 7 illustrates a source code example 700 that implements a non-vectorizable loop with a store. The non-vectorizable loop of the illustrated example can still benefit from conversion of its store operation to a non-temporal store instruction, as performed by the example compiler system 100.

FIG. 8 illustrates a source code example 800 that implements a compress loop. with a store (and a monotonically-increasing non-linear induction variable) under a condition. In the source code example 800, the writes to the array arr2 are contiguous. This can be identified by a contiguity analysis performed by the example compiler system 100, and the non-temporal transformation can be performed by the example compiler system 100 regardless of whether the loop gets vectorized (e.g., by using the advanced AVX512 instructions to support the compress pattern on some devices).

FIG. 24 illustrates a source code example 2400 that implements a loop nest with an inner loop that has a small, fixed trip count known at compile time (e.g., the j loop with M=32 in the illustrated example) and includes a store that is unit-strided with respect to an outer loop (e.g., the store to A which is unit-strided in the i loop in the illustrated example). This can be identified by the contiguity analysis performed by the example compiler system 100, and the transformation can be performed by the compiler system 100 by treating the store in the inner loop as if it were multiple contiguous stores in the outer loop. When transformed, the store in the inner loop is optimized using multiple temporary buffers, with each temporary buffer corresponding to a different inner loop iteration. In the illustrated example, such transformation would result in 32 temporary buffers in total, with each corresponding to a different value of j. This transformation is conceptually equivalent to fully unrolling the inner loop, performing the streaming-store based transformation on each unrolled instance of the store, and then re-rolling the inner loop.

Returning to FIG. 1, in some examples, the compiler system 100 performs streaming-store based compilation in two phases. In a first example phase, a low level virtual machine (LLVM) intermediate representation (IR) is generated by the example front-end(s) 115, which handle languages such as C, C++, Fortran, etc. Next, the example scalar optimizer 120 performs various scalar optimizations and other generic compiler transformations on the IR. The example loop optimizer 125 performs loop optimizations, which may include hoisting loads/stores that happen in both sides of an "if" statement that is part of the loop. In some examples, the loop optimizer 125 performs vectorization with unaligned stores for non-temporal candidate loops. In some examples, the loop optimizer 125 performs other loop transformations, such as loop-unrolling, etc. Next, the example candidate marker 105 marks store operations as non-temporal (e.g., using the loop transformation infrastructure implemented by the loop optimizer 125) based on contiguity analysis and non-temporality, as disclosed further herein. In some examples, more LLVM IR scalar optimizations are then performed by the scalar optimizer 120.

In a second example phase, the example streaming-store transformer 110 transforms the marked, non-temporal store operations in a given loop to form transformed program code. In the transformed program code, an intermediate buffer (e.g., which may be small in size to fit in cache) is used per contiguous block of memory accesses and a library helper function is called subsequently (e.g., periodically or aperiodically) to perform the stores to the original memory destination pointer using non-temporal store instructions. Next, the code generator 130 performs code generation to output compiled code for a particular target.

To summarize, in the foregoing example two phase implementation, the candidate marker 105 of the compiler system 100 performs non-temporal marking of stores phase during the first phase as part of the loop-optimization framework. In a later second phase that is invoked close to code generation, the streaming-store transformer 110 of the compiler system 100 considers the "marked" unaligned stores as candidates for streaming-store code transformation. In some examples, if code legality checks are satisfied for a marked set of stores that access a contiguous block of memory, the streaming-store transformer 110 transforms the marked set of stores to streaming-store based transformed code, which use an intermediate buffer and a library helper function, as described above and in further detail below.

FIGS. 9, 10A-B and 11 provide further code examples to illustrate example operation of the compiler system 100 to perform streaming-store based compilation as disclosed herein. FIG. 9 illustrates a program code example 900 that results from the compiler system 100 performing vectorization of the program code example 400 of FIG. 4. In this example, the incoming "dst" and "src" arrays in the program code example 400 of FIG. 4 are assumed to be pointing to distinct arrays, and the compiler system 100 is assumed to have information about the alignment of the dst array, including that the base-pointer dst is aligned properly at a 64-byte boundary. The SIZE parameter of the illustrated example is a compile-time constant that is a large multiple of cache-line size that makes the store accesses able to be made non-temporal. The overall data accessed in the loop of the illustrated example is larger than the size of the cache(s). Thus, the loop of the illustrated example can benefit from use of non-temporal store instructions. Note that the two store accesses inside the loop have a relative misalignment with respect to 64-byte boundary, so both of them are unable to be aligned together.

With reference to the examples of FIGS. 4 and 9, the candidate marker 105 of the compiler system 100 implements (e.g., executes) a marking phase as part of the loop optimization framework in the compiler. In the illustrated example, the loop optimization framework has a canonical representation for all memory accesses inside the loop, as well as information on loop-carried data-dependencies involving each memory access. This information is used by the candidate marker 105 to identify a set of stores inside the loop that together access a contiguous block of memory. In some examples, any such candidates are also checked by the candidate marker 105 to confirm that there are no store-load or store-store dependences that will make the transforming the set of stores to streaming-store code, as disclosed herein, illegal.

Another property that gets checked by the candidate marker 105 is whether the candidates satisfy a non-temporal property, which indicates there is no benefit to keeping those stored values in cache. Whether a candidate set of stores satisfies the non-temporal property can be determined by the candidate marker 105 from a variety of mechanisms, such as profiling information, user annotation (e.g., such as "#pragma omp simd nontemporal(dst)"), compiler cost modeling, etc. In some examples, the candidate marker 105 implements a cost model that can consider the total amount of data accessed in the loop. If the total data-size exceeds the size of the cache, then the accesses can be considered non-temporal by the candidate marker 105. In some examples, any candidate set of stores that satisfies the code legality and cost-modeling criteria gets marked by the candidate marker 105 as non-temporal (e.g., using an attribute on the store instructions to perform the marking). In some cases where the candidate marker 105 can perform the non-temporal property check (e.g., to check if the loop trip-count is large such that the total data accessed in the loop to exceed the cache-size) as part of a library function call that is introduced as part of the transformation phase described below, the marking phase can be aggressive and mark those candidates as well.

The program code examples of FIG. 5-8 demonstrate other scenarios in which the candidate marker 105 is able to mark the candidate stores get "marked." In the program code example 500 of FIG. 5, the vectorized loop has already been unrolled before the marking phase, but the contiguity analysis performed by the candidate marker 105 can identify that the set of two stores together form a contiguous block of memory (e.g., using data-size accessed per store, vector-stride, vector-length etc.). The program code example 600 of FIG. 6 depicts a scenario in which all fields of a structure get stored using separate accesses inside the loop. The contiguity analysis performed by the candidate marker 105 can prove that the entire structure gets written, thereby ensuring the contiguity. Note that any padding field inserted by the compiler can also be considered as "stored" as part of this analysis. The program code example 700 of FIG. 7 depicts a loop that is not vectorizable, but the store accesses inside the loop are contiguous and non-temporal. The scalar store can be marked by the candidate marker 105 for this case as well, and the store can be transformed to use non-temporal vector store instructions by the transformation pass that runs later. The program code example 800 of FIG. 8 depicts a case in which the store happens under a condition inside the loop and the store is done using an index that is incremented after the store. This can be treated by the candidate marker 105 as a special case of a contiguous block, and the non-temporal transformation can be applied for this case as well.

With reference to the examples of FIGS. 9, 10A-B and 11, the streaming-store transformer 110 of the compiler system 100 next implements (e.g., executes) a transformation phase, which is also referred to as an unaligned transformation phase. In the unaligned transformation phase, those candidate sets of stores that are unaligned are either converted by the streaming-store transformer 110 to aligned non-temporal streaming stores, or are returned by the streaming-store transformer 110 to regular stores (where the latter is expected to rarely occur). If any store in the loop is converted to non-temporal streaming store, a fence to synchronize the non-temporal stores is added by the streaming-store transformer 110 after the loop. This fence helps to ensure that the non-temporal streaming-store writes are flushed to memory before any later memory access. Since this fence gets inserted after the loop, it is unlikely to add any significant overhead to the execution time of the program.

In some examples, there may be one or more scalar compiler-optimization passes that are executed by the compiler system 100 after the marking phase, including passes to perform superword-level parallelism (SLP) vectorization (e.g., where a set of similar load/store/ops on successive array elements gets converted into a single vector statement). These additional passes can introduce new opportunities for the transformation phase. Also, because the transformation phase introduces new memory accesses and library function calls inside the loop, it may hinder the scalar optimizations. That is why in some examples, the streaming-store transformer 110 performs transformation phase later close to compiler code generation phase.

In some examples, the streaming-store transformer 110 generates the aligned streaming-store instructions of transformation phase based on a dynamic realignment approach. However, in some examples, the streaming-store transformer 110 generates the aligned streaming-store instructions of transformation phase based on a static realignment approach. The two different approaches may have different code legality requirements.

A common requirement for both the dynamic realignment and the static realignment approaches is that the stores are to be contiguous within the loop. This requirement means that no other load or store of the entire array range may occur in the loop. In some examples (e.g., for a set of stores inside the loop that together constitute a contiguous block), the array access is also expected to be affine, and the array index is expected to increment by one for each successive loop iteration.

In the dynamic realignment approach, the streaming-store transformer 110 of the complier system 100 uses an auxiliary structure to pass loop-carried information into a library function. In some examples, the auxiliary structure includes a recirculation buffer containing partial cache-line information and the count of elements saved in that buffer. In some examples, the auxiliary structure also includes a misalignment of the destination pointer. In some examples, the auxiliary structure further includes an actual destination pointer to which the data is to be written. For example, using the dynamic realignment approach, the streaming-store transformer 110 may transform the program code example 900 of FIG. 9 to the transformed code example 1000 shown in FIG. 9A and FIG. 9B. Thus, the transformed code example 1000 of FIG. 10A is an example of a transformation phase with a dynamic realignment step. FIG. 10B is a continuation of the transformed code example 1000 of FIG. 10A. The outlined portions of the transformed code example 1000, which are labelled 1005-1020, represent the actions performed by the streaming-store transformer 110 of the compiler system 100 in the transformation phase.

In the transformed code example 1000 of FIGS. 10A-B, only the second store is converted based on the dynamic realignment approach (because the first store is to an aligned address known to the compiler). In the illustrated example, the streaming-store transformer 110 redirects the second store to use a small store buffer (e.g., referred to as "store_buffer" in the illustrated example). When this buffer is filled, a call to an example dynamic realignment function (e.g., library helper function, referred to as "store_unaligned_streaming" in the illustrated example) to drain the buffer is made. The first time this function is called, it stores sufficient data via a traditional memory-copy code sequence to cause the destination pointer to be aligned. In subsequent calls of this function, the buffer is filled to make a full cache line store before being drained via a streaming-store instruction. The function continues to use streaming-stores for as long as there is sufficient data to do so. At the end of the function, if it is not the final call, the library function stores the data into the buffer; otherwise, the function drains the final pieces using a traditional memory-copy code sequence.

In the dynamic realignment approach, the streaming-store transformer 110 defines a respective store buffer for each non-temporal store contiguous block to be transformed to a streaming-store implementation. The size of the store buffer can be chosen by the streaming-store transformer 110 using a compiler heuristic, for example, to yield a size of 64, 128 or 256 cache-lines, for example. In some examples, the compiler system 100 allocates this store buffer on the stack. The dynamic realignment approach introduces new stores and loads using the store buffer, but since the overall size of this buffer is small, these stores/loads will get the benefit of caching in most modern processors. The actual stores to memory that happen inside the library (every few iterations when the store buffer gets full) get the benefit of streaming-store instructions that saves RFO transactions.

In the dynamic realignment approach, a final call to the library function is made after the loop for each contiguous block to store the last few bytes from the buffer into memory using regular store instructions. In some examples, a fence call to synchronize is inserted the streaming-store transformer 110 after the loop if one has not been inserted already.

In the static realignment approach, the streaming-store transformer 110 of the complier system 100 does not utilize store buffer (or another type of temporary data structure or object, such as the misalign info structure in the program code example 1000 of FIGS. 10A-B) that is used in the dynamic realignment approach. Rather, the static realignment approach uses non-temporal streaming-stores for the entire array, which introduces an extra requirement that the unaligned code before and after the region accessed in the loop can have spurious stores introduced by the streaming-store transformer 110, and may requires additional compiler analysis to ensure code legality of the transformation. (For example, there may be padding or other writes that may occur without an intervening memory synchronization operation.)

For example, using the static realignment approach, the streaming-store transformer 110 may transform the program code example 900 of FIG. 9 to the transformed code example 1100 shown in FIG. 11. The outlined portions of the transformed code example 1100, which are labelled 1105-1115, represent the actions performed by the streaming-store transformer 110 of the compiler system 100 in the transformation phase. In the illustrated example, the misalignment is statically known to enable use of the align instruction. In each loop iteration, the line to be stored is combined with partial data from the previous line to compute what the value to be stored to the aligned pointer should be. The data which is not stored is saved in a recirculation buffer for the next loop iteration. This recirculation buffer is to be initialized with the existing data preceding the array before the first loop iteration, and after the last loop iteration, it is to be combined with the immediately following data. In the illustrated example, the static realignment approach does not make use of a library function, so the streaming-store transformer 110 is able to perform its streaming-store transformation as part of one or more compiler passes.

Some potential advantages of the dynamic realignment approach over the static realignment approach are that the dynamic realignment approach uses library functions that can implement multiple variants of the actual function that performs the streaming store instructions, and a particular variant can be chosen at run-time based on CPU characteristics. As such, the dynamic realignment approach may work well regardless of which processor the optimized application is to execute on. For example, an AVX2 code-path can be chosen for processors that support the AVX2 instruction-set architecture (ISA), whereas an AVX512 variant can be chosen for processors that support AVX512, thus ensuring the binary does not need to be recompiled for best performance on any particular architecture (even in the future). In some examples, the non-temporal property itself can be checked as part of the library code by examining if the trip-counts are large. If the trip-counts are not large, the library can use a generic implementation of the stores that does not use any non-temporal streaming stores. This makes it easier for the optimization to be applied in more customer program codes, because the user (e.g., programmer) does not have to analyze the application and insert the nontemporal pragmas into the appropriate loops.

Streaming-store based compilation as implemented by the example compiler system 100 in accordance with teachings of this disclosure may provide benefits whenever loops are bound by memory bandwidth. For each store operation which can be converted to use a non-temporal streaming store instruction, one RFO operation is avoided, thereby leading to a saving of one cache-line access (e.g., with the streaming store instruction utilizing just one write instead of one read plus one write per cache-line). This can lead to substantial benefits depending on the total number of loads and stores inside the loop that are bound by bandwidth. In some examples, applications are optimized with cache-blocking of memory-accesses in a loop to save memory bandwidth. Even in such examples, the output arrays may not be blocked and may benefit from streaming-store based compilation. However, if the same memory locations are read and stored in a loop (e.g., as in an update operation of the form "a[i]+=b[i]"), streaming-store based compilation may not yield as much a benefit as the RFO operation needs to happen anyway for the load operations in the loop.

Streaming-store based compilation as implemented by the example compiler system 100 in accordance with teachings of this disclosure provides an automated compiler transformation that identifies each contiguous store in a source-code loop and automatically transforms an unaligned store (e.g., which can be in vectorized or scalar form) or a set of stores (e.g., which together form a contiguous block) into a write to an intermediate buffer (e.g., that remains in cache) followed by subsequent writes to aligned memory locations from the buffer utilizing non-temporal streaming-store vector instructions. This can lead to performance benefits in applications that are limited by memory bandwidth and have loop nests with store accesses that fit one of the several patterns described herein.

FIG. 12 illustrates another program code example 1200 for which streaming-store compilation disclosed herein can be applied. The program code example 1200 is an excerpt from a Fortran application and has a large number of unaligned stores inside a streaming vector-loop. The loop is marked as streaming by the user using the "nontemporal" directive, but the alignment of the accesses is unknown. Without streaming-store compilation as disclosed herein, a prior compiler can generate streaming-stores for only up to two of the eighteen stores inside this loop. With the streaming-store compilation as disclosed herein, the compiler system 100 can compile the program code example 1200 to get the memory bandwidth savings (from RFO avoidance) for all eighteen stores.

Figures 13, 14:
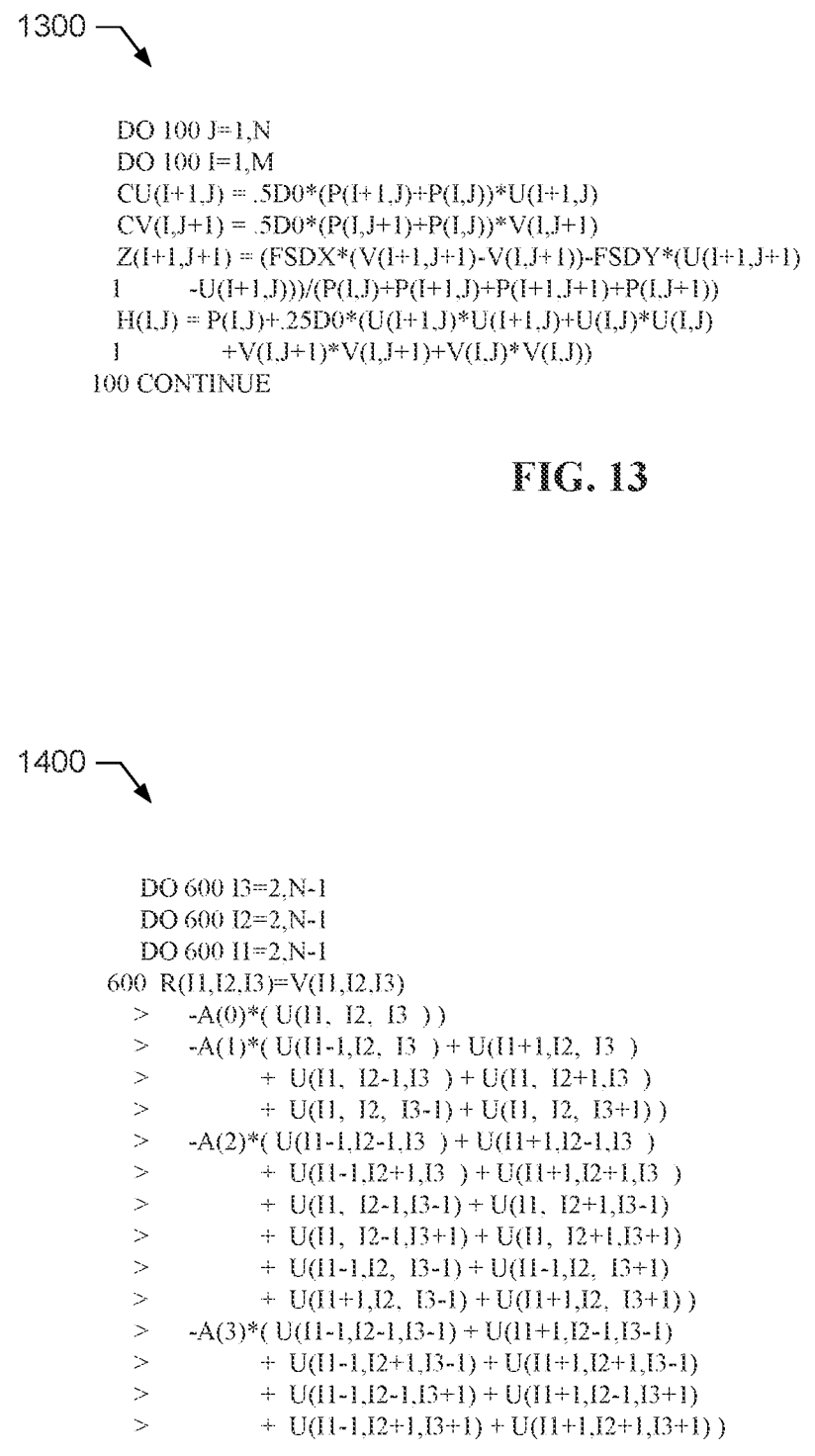

FIG. 13 illustrates yet another program code example 1300 for which streaming-store compilation disclosed herein can be applied. FIG. 14 illustrates yet another program code example 1400 for which streaming-store compilation disclosed herein can be applied. FIG. 25 illustrates still another program code example 2500 for which streaming-store compilation disclosed herein can be applied.

Returning to FIG. 2, the example computer system 200 includes an example input 208, an example output 210, an example CPU 206, an example cache 204, an example buffer 212, an example aligner 214, an example regular store instructor 216, an example buffer store instructor 218 and example memory 202. The memory 202 is to store for data and instructions. In the illustrated example, the aligner 214 receives an input 208 (e.g., an array). Next, the aligner 214 first checks if the array is empty and then checks if the boundaries of the array are aligned. If the boundaries are not aligned, the regular store instructor 216 instructs an application to store data from the array in the memory 202. If the boundaries are aligned, the buffer store instructor 218 instructs an application to write data from the array into the buffer 212. The buffer store instructor 218 instructs the compiled application to check if the buffer 212 is full and, if it is, the buffer store instructor 218 instructs data from buffer 212 to be stored in memory 202.

Returning to FIG. 1, in some examples, the compiler system 100 includes means for marking store instructions. For example, the means for marking store instructions may be implemented by the example candidate marker 105. In some examples, the candidate marker 105 may be implemented by machine executable instructions such as that implemented by at least one or more blocks of FIGS. 17 and/or 18 executed by processor circuitry, which may be implemented by the example processor circuitry 2012 of FIG. 20, the example processor circuitry 2100 of FIG. 21, and/or the example Field Programmable Gate Array (FPGA) circuitry 2200 of FIG. 22. In other examples, the example candidate marker 105 is implemented by other hardware logic circuitry, hardware implemented state machines, and/or any other combination of hardware, software, and/or firmware. For example, the example candidate marker 105 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the compiler system 100 includes means for transforming store instructions. For example, the means for transforming store instructions may be implemented by the example streaming-store transformer 110. In some examples, the streaming-store transformer 110 may be implemented by machine executable instructions such as that implemented by at least one or more blocks of FIGS. 17 and/or 19 executed by processor circuitry, which may be implemented by the example processor circuitry 2012 of FIG. 20, the example processor circuitry 2100 of FIG. 21, and/or the example Field Programmable Gate Array (FPGA) circuitry 2200 of FIG. 22. In other examples, the streaming-store transformer 110 is implemented by other hardware logic circuitry, hardware implemented state machines, and/or any other combination of hardware, software, and/or firmware. For example, the streaming-store transformer 110 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

While example manners of implementing the compiler system 100 and computer system 200 are illustrated in FIGS. 1-15, one or more of the elements, processes, and/or devices illustrated in FIGS. 1-15 may be combined, divided, re-arranged, omitted, eliminated, and/or implemented in any other way. Further, the example candidate marker 105, the example streaming-store transformer 110, the example front-end(s) 115, the example scalar optimizer 120, the example loop optimizer 125, the example compiled code generator 130, the example memory 202, the example cache 204, the example CPU 206, the example input 208, the example output 210, the example buffer 212, the example regular store instructor 216, the example buffer store instructor 218 and/or, more generally, the example compiler system 100 and/or the example computer system 200 of FIGS. 1-15 may be implemented by hardware alone or by hardware in combination with software and/or firmware. Thus, for example, any of the example candidate marker 105, the example streaming-store transformer 110, the example front-end(s) 115, the example scalar optimizer 120, the example loop optimizer 125, the example compiled code generator 130, the example memory 202, the example cache 204, the example CPU 206, the example input 208, the example output 210, the example buffer 212, the example regular store instructor 216, the example buffer store instructor 218 and/or, more generally, the example compiler system 100 and/or the example computer system 200 could be implemented by processor circuitry, analog circuit(s), digital circuit(s), logic circuit(s), programmable processor(s), programmable microcontroller (s), graphics processing unit(s) (GPU(s)), digital signal processor(s) (DSP(s)), application specific integrated circuit(s) (ASIC(s)), programmable logic device(s) (PLD(s)), field programmable gate arrays (FPGAs) and/or field programmable logic device(s) (FPLD(s)) such as Field Programmable Gate Arrays (FPGAs). Further still, the example compiler system 100 and/or the example computer system 200 may include one or more elements, processes and/or devices in addition to, or instead of, those illustrated in FIGS. 1-15, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example hardware logic circuitry, machine readable instructions, hardware implemented state machines, and/or any combination thereof for implementing the example compiler system 100 and the example computer system 200 are shown in FIGS. 16-19. In these examples, the machine readable instructions may be one or more executable programs or portion(s) of an executable program for execution by a computer processor and/or processor circuitry, such as the processor circuitry 2012 shown in the example processor platform 2000 discussed below in connection with FIG. 20 and/or the example processor circuitry discussed below in connection with FIGS. 21 and/or 22. The one or more programs, or portion(s) thereof, may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program or programs and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program(s) is(are) described with reference to the flowcharts illustrated in FIGS. 16-19, many other methods of implementing the example compiler system 100 and/or the example computer system 200 may alternatively be used. For example, the order of execution of the blocks may be changed, and/or some of the blocks described may be changed, eliminated, combined and/or subdivided into multiple blocks. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 16-19 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media. Also, as used herein, the terms "computer readable" and "machine readable" are considered equivalent unless indicated otherwise.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 16:
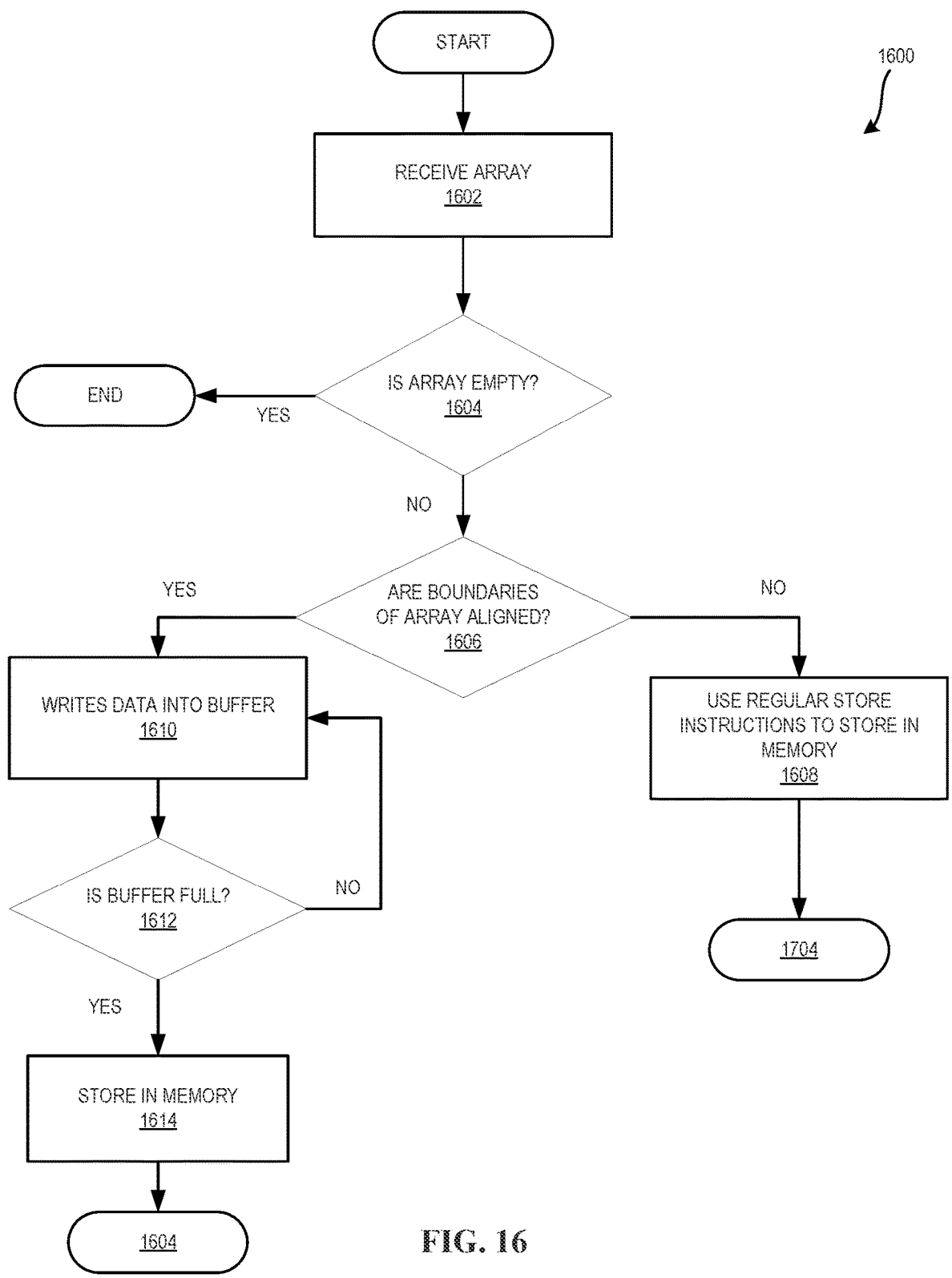
FIG. 16 is a flowchart representative of example machine readable instructions that may be executed by example processor circuitry to implement the example computer system of FIG. 2.

FIG. 16 is a flowchart representative of example machine readable instructions and/or example operations 1600 that may be executed and/or instantiated by processor circuitry to implement the computer system 200 of FIG. 2. The machine readable instructions and/or operations 1600 facilitate memory alignment to enable use of non-temporal memory operations and avoid RFO. With reference to the preceding figures and associated written descriptions, the machine readable instructions and/or operations 1600 of FIG. 16 begin with the aligner 214 receiving an array (block 1602). Next, the aligner 214 determines if the array is empty (block 1604). If the array is empty, the machine readable instructions and/or operations 1600 end. If the array is not empty, the aligner 214 determines if the array boundaries of the array are aligned (block 1606). If the boundaries are not aligned, the regular store instructor 216 instructs the use of regular store instructions to store data in the memory 202 (block 1608) and control returns to block 1604 to once again check if the array is empty. However, if at block 1606, the aligner 214 determines that the array boundaries are aligned, the buffer store instructor 218 instructs data to be written into the buffer 212 (block 1610). The buffer store instructor 218 will instruct that the buffer 212 is checked to determine if the buffer is full (block 1612). If the buffer 212 is not full it, control returns to block 1610 and data is written into the buffer 212. Next, the buffer store instructor 1918 instructs that the buffer 212 is checked to determine if it is full (block 1612). If the buffer 212 is now full, the buffer store instructor 1618 instructs that the buffer 212 is emptied, and the data is stored in the memory 202 (block 1614). Control then returns to block 1604.

Figure 17:
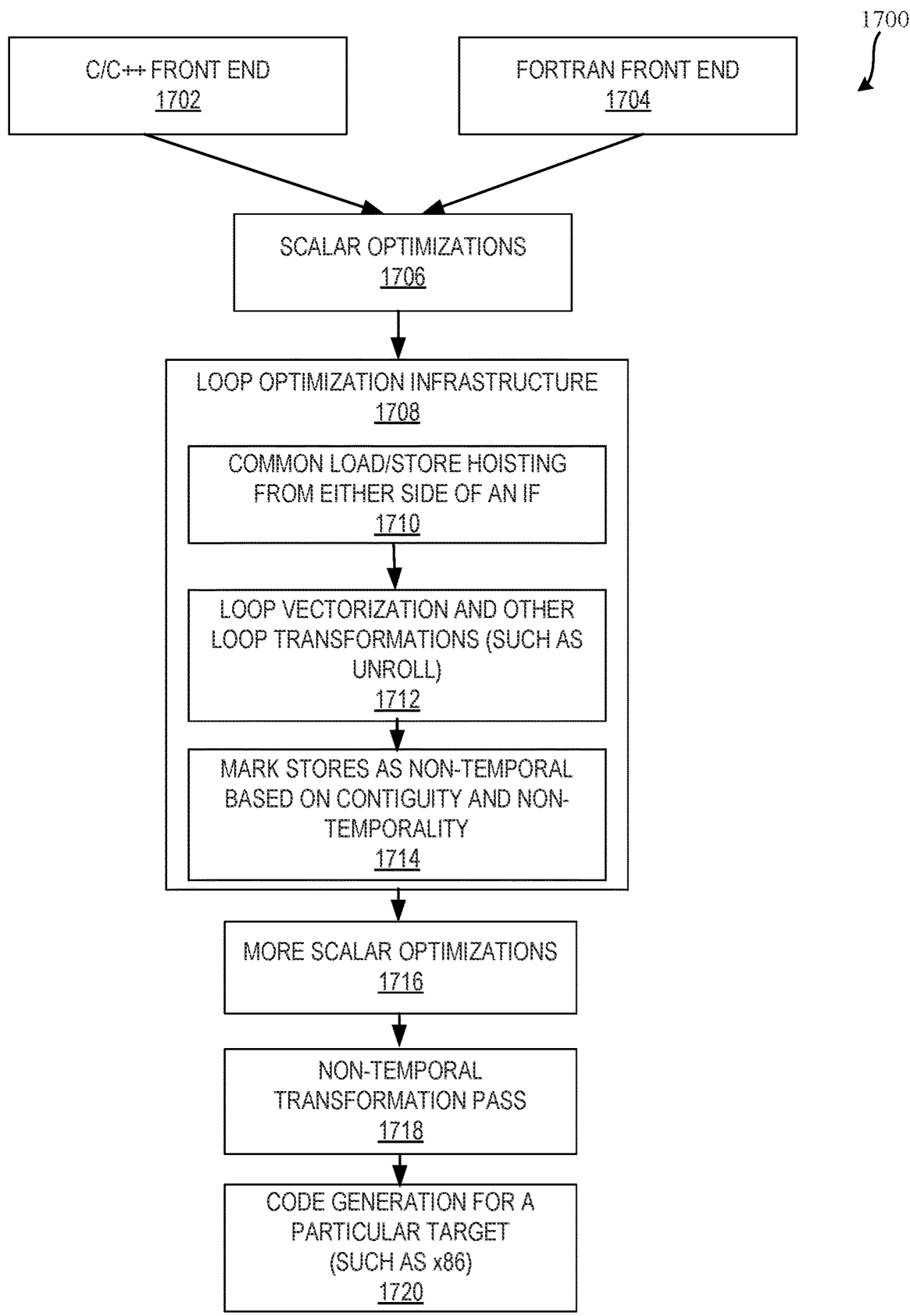
FIGS. 17-19 are flowcharts representative of example machine readable instructions that may be executed by example processor circuitry to implement the example compiler system of FIG. 1.

FIG. 17 is a flowchart representative of example machine readable instructions and/or example operations 1700 that may be executed and/or instantiated by processor circuitry to implement the compiler system 100 of FIG. 1. With reference to the preceding figures and associated written descriptions, the machine readable instructions and/or operations 1600 of FIG. 16 begin with an appropriate one of the front-ends 115 generating an intermediate representation (IR) corresponding to input source program code (block 1702 and/or block 1704). For example, the front-ends(s) 115 may be implemented with a C/C++, Fortran, etc. Next, the scalar optimizer 120 performs scalar optimization, as described above (block 1706). Next, the loop optimizer 125 implements a loop optimization infrastructure, as described above (block 1708). For example, the loop optimization infrastructure (block 1708) may include the loop optimizer 125 performing load/store hoisting from either side of an "if" statement (block 1610). Additionally or alternatively, the loop optimization infrastructure (block 1708) may include the loop optimizer 125 performing loop vectorization and other loop transformations (e.g., such as unroll) (block 1712). In the illustrated example, the loop optimization infrastructure (block 1708) also includes the candidate marker 105 marking store operations as non-temporal based on contiguity and non-temporality properties (block 1714), as described above. Next, the scalar optimizer 120 performs more scalar optimizations, as described above (block 1716). Next, the streaming-store transformer 110 performs a non-temporal streaming-store transformation pass, as described above (block 1718). Next, the compiler code generator 130 performs code generation to output compiled code for a particular target (block 1720).

Figure 18:
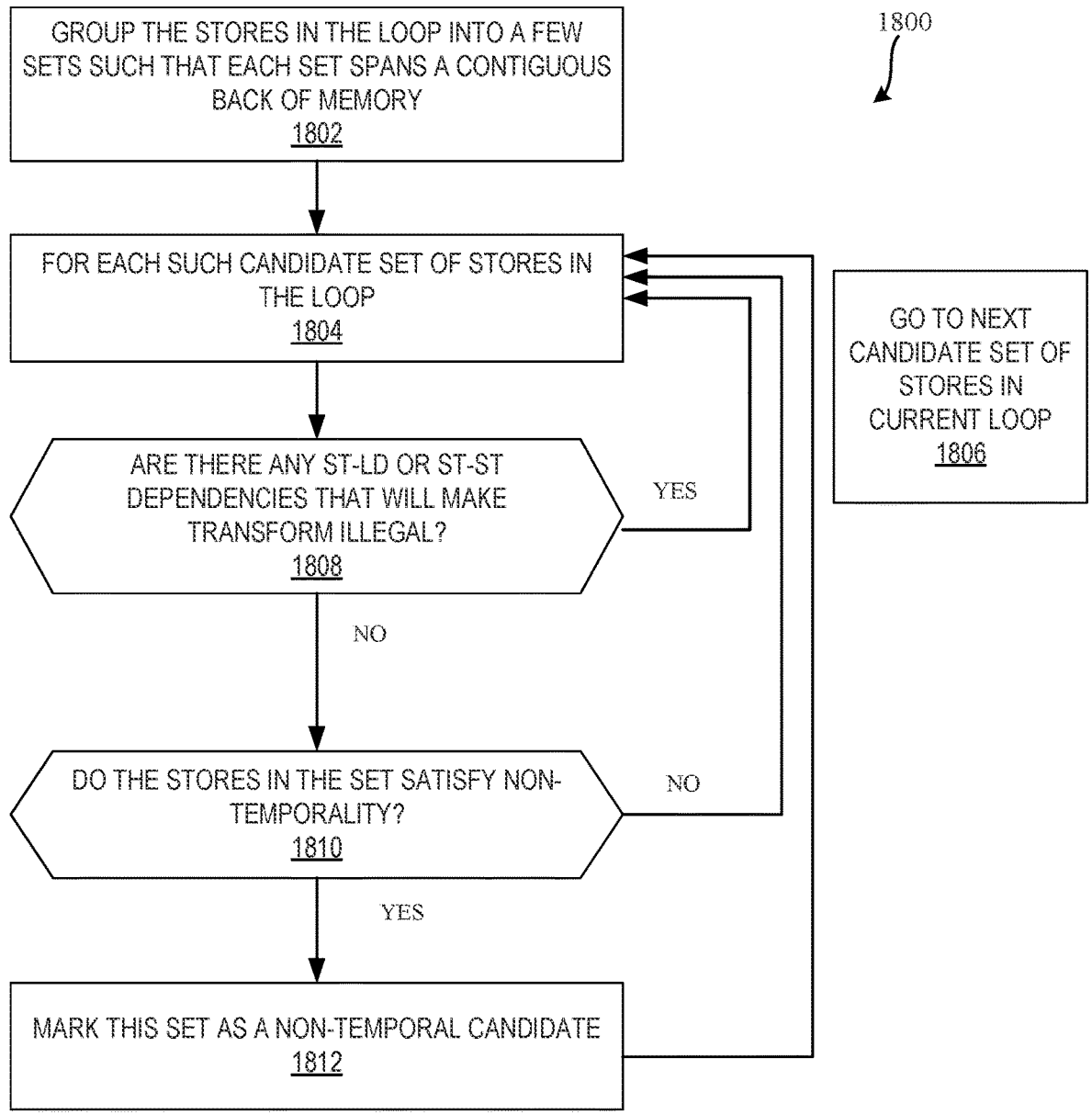

FIG. 18 is a flowchart representative of example machine readable instructions and/or example operations 1800 that may be executed and/or instantiated by processor circuitry to implement the candidate marker 105 of the compiler system 100 of FIG. 1. The machine readable instructions and/or operations 1800 perform non-temporal marking of store operations, as disclosed above. In some examples, the machine readable instructions and/or operations are executed/performed on each loop in each function in the compilation scope. With reference to the preceding figures and associated written descriptions, the machine readable instructions and/or operations 1800 of FIG. 18 begin with the candidate marker 105 grouping the stores in a program loop into sets such that each set of store operations spans a contiguous block of memory (block 1802). Next, the candidate marker 105 will iterate over the grouped sets of store operations in the current loop (block 1804 and block 1806). For a given iteration, the candidate marker 105 will check whether are there any store-load (ST-LD) or store-store (ST-ST) dependencies that will make performing a streaming-store transformation on the given grouped set of store operations illegal (block 1808). The candidate marker 105 also checks is the stores in the given grouped set satisfy the non-temporality property (block 1810). If both checks pass, the candidate marker 105 marks the given set of store operations as a non-temporal candidate for streaming-store transformation (block 1812).

Figure 19:
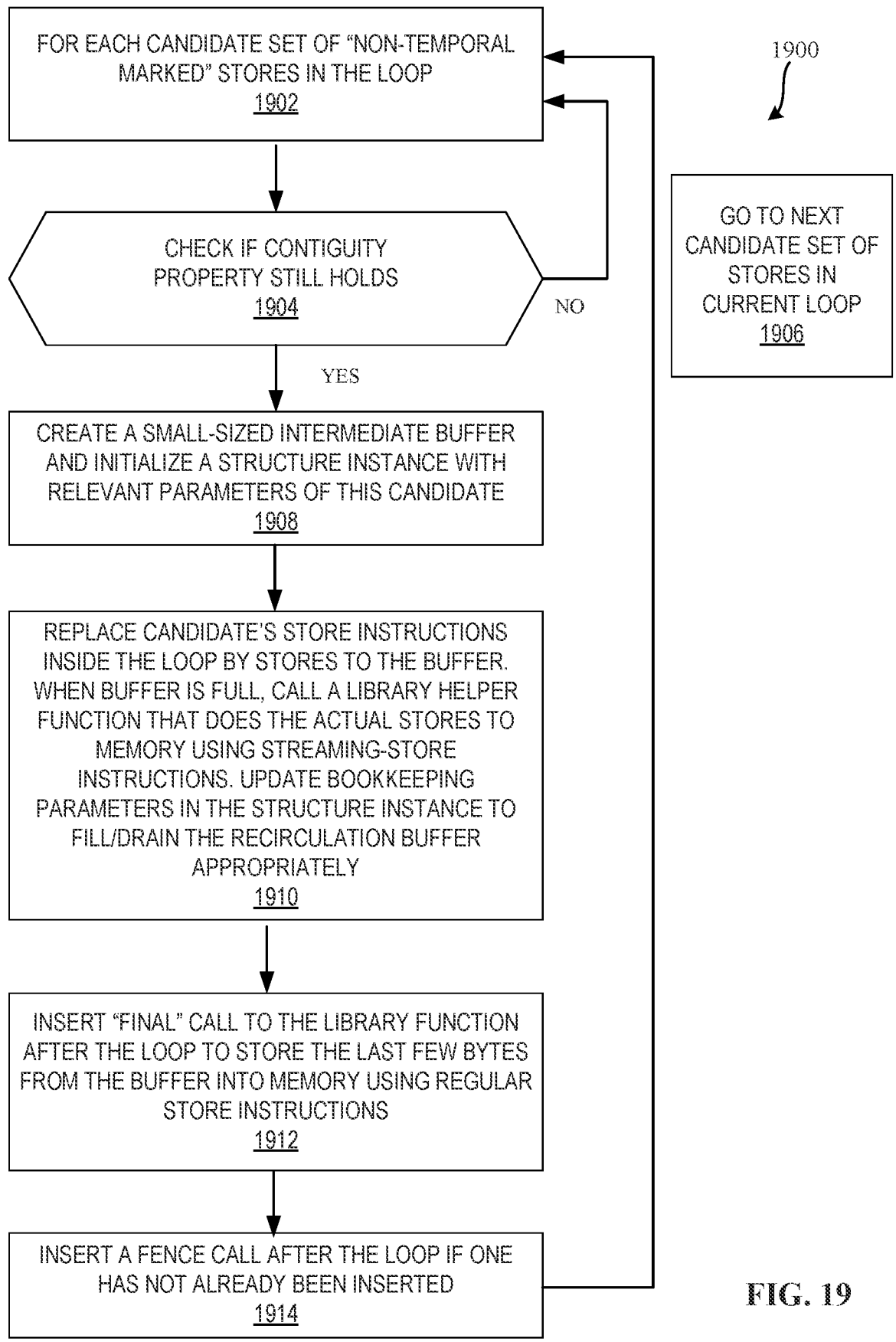

FIG. 19 is a flowchart representative of example machine readable instructions and/or example operations 1900 that may be executed and/or instantiated by processor circuitry to implement the streaming-store transformer 110 of the compiler system 100 of FIG. 1. The machine readable instructions and/or operations 1900 perform non-temporal streaming-store transformation pass before compile code generation for a target, as disclosed above. In some examples, the machine readable instructions and/or operations are executed/performed on each loop in each function in the compilation scope. With reference to the preceding figures and associated written descriptions, the machine readable instructions and/or operations 1900 of FIG. 19 begin with the streaming-store transformer 110 iterating over each candidate set of non-temporal marked store operations in the loop (block 1902 and block 1906). Next, the streaming-store transformer 110 checks if the contiguity property still holds for the given candidate set of store operations (block 1904). Next, the streaming-store transformer 110 creates a small-sized intermediate buffer and initializes a structure instance with relevant parameters for the given candidate set of store operations (block 1908). Next, the streaming-store transformer 110 replaces the candidate's store instructions inside the loop with transformed program code that (i) stores the data to the buffer, (ii) when buffer is full, calls a library helper function that perform the actual stores to memory using streaming-store instructions, and (iii) updates bookkeeping parameters in the structure instance to fill/drain the buffer appropriately (block 1910). Next, streaming-store transformer 110 inserts, in the transformed program code, a final call to the library function after the loop to store the last few bytes from the buffer into memory using regular store instructions (block 1912). Next, the streaming-store transformer 110 inserts a fence call in the transformed program code after the loop if one has not already been inserted (block 1914). The streaming-store transformer 110 then iterates to the next candidate set of stores in current loop (block 1906).

Figure 20:
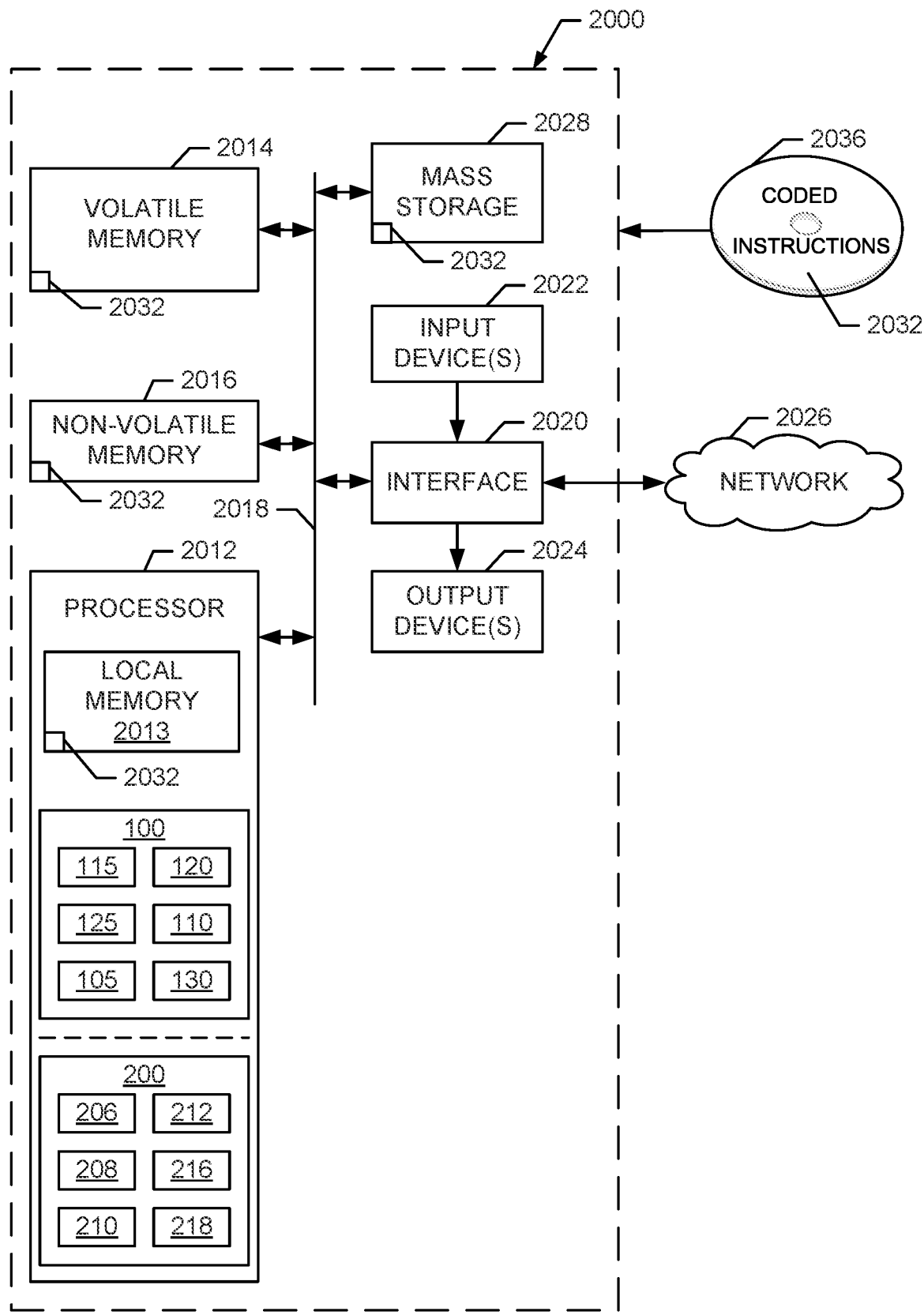
FIG. 20 is a block diagram of an example processor platform including processor circuitry structured to execute the example machine readable instructions of FIGS. 18, 18 and/or 19 to implement the example compiler system of FIG. 1.

FIG. 20 is a block diagram of an example processor platform 2000 structured to execute and/or instantiate the machine readable instructions and/or operations of FIGS. 16, 17, 18 and/or 19 to implement the example compiler system 100 and/or the example computer system 200 of FIGS. 1-2. The processor platform 2000 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, etc., or any other type of computing device.

The processor platform 2000 of the illustrated example includes a processor 2012. The processor 2012 of the illustrated example is hardware. For example, the processor 2012 can be implemented by one or more integrated circuits, logic circuits, microprocessors, GPUs, DSPs, or controllers from any desired family or manufacturer. The hardware processor 2012 may be a semiconductor based (e.g., silicon based) device. In some examples, the processor 2012 implements the example candidate marker 105, the example streaming-store transformer 110, the example front-end(s) 115, the example scalar optimizer 120, the example loop optimizer 125 and/or the example compiled code generator 130 of the example compiler system 100. In some examples, the processor 2012 implements the example CPU 206, the example input 208, the example output 210, the example buffer 212, the example regular store instructor 216, the example buffer store instructor 218 and/or the example computer system 200.

The processor 2012 of the illustrated example includes a local memory 2013 (e.g., a cache, registers, etc.). The processor circuitry 2012 of the illustrated example is in communication with a main memory including a volatile memory 2014 and a non-volatile memory 2016 via a link 2018. The link 2018 may be implemented by a bus, one or more point-to-point connections, etc., or a combination thereof. The volatile memory 2014 may be implemented by Synchronous Dynamic Random Access Memory (SDRAM), Dynamic Random Access Memory (DRAM), RAMBUS® Dynamic Random Access Memory (RDRAM®) and/or any other type of RAM device. The non-volatile memory 2016 may be implemented by flash memory and/or any other desired type of memory device. Access to the main memory 2014, 2016 of the illustrated example is controlled by a memory controller 2017.

The processor platform 2000 of the illustrated example also includes interface circuitry 2020. The interface circuitry 2020 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 2022 are connected to the interface circuitry 2020. The input device(s) 2022 permit(s) a user to enter data and/or commands into the processor circuitry 2012. The input device(s) can be implemented by, for example, an audio sensor, a microphone, a camera (still or video), a keyboard, a button, a mouse, a touchscreen, a track-pad, a trackball, a trackbar (such as an isopoint device), a voice recognition system and/or any other human-machine interface. Also, many systems, such as the processor platform 2000, can allow the user to control the computer system and provide data to the computer using physical gestures, such as, but not limited to, hand or body movements, facial expressions, and face recognition.

One or more output devices 2024 are also connected to the interface circuitry 2020 of the illustrated example. The output devices 2024 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer and/or speakers(s). The interface circuitry 2020 of the illustrated example, thus, typically includes a graphics driver card, a graphics driver chip and/or graphics processor circuitry such as a GPU.

The interface circuitry 2020 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 2026. The communication can be via, for example, an Ethernet connection, a digital subscriber line (DSL) connection, a telephone line connection, a coaxial cable system, a satellite system, a line-of-site wireless system, a cellular telephone system, an optical connection, etc.

The processor platform 2000 of the illustrated example also includes one or more mass storage devices 2028 to store software and/or data. Examples of such mass storage devices 2028 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 2032 which may be implemented by the machine readable instructions of FIGS. 16, 17, 18 and/or 19 may be stored in the mass storage device 2028, in the volatile memory 2014, in the non-volatile memory 2016, in the local memory 2013 and/or on a removable non-transitory computer readable storage medium, such as a CD or DVD 2036.

Figure 21:
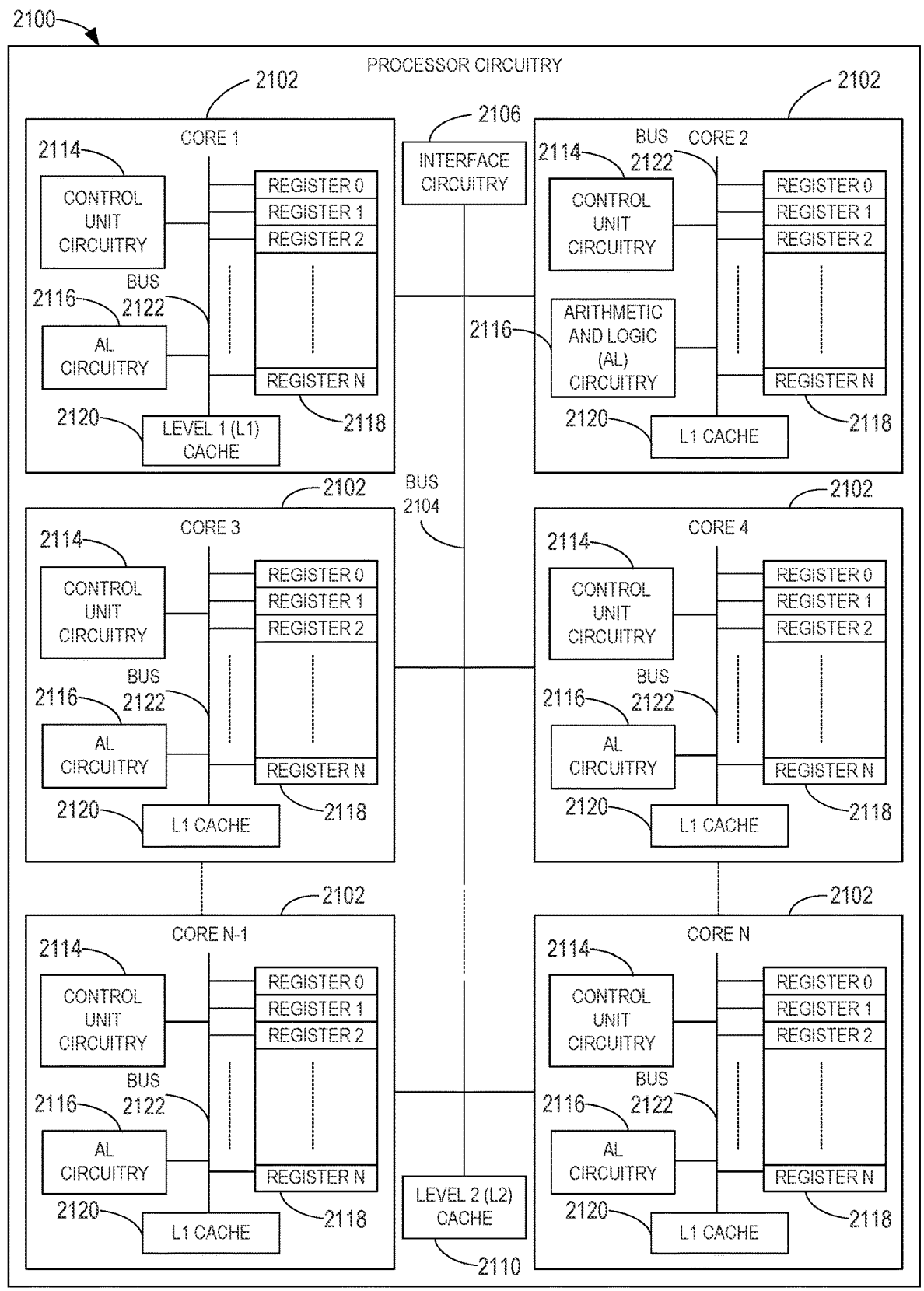
FIG. 21 is a block diagram of an example implementation of the processor circuitry of FIG. 20.

FIG. 21 is a block diagram of an example implementation of the processor circuitry 2012 of FIG. 20. In this example, the processor circuitry 2012 of FIG. 20 is implemented by a microprocessor 2100. For example, the microprocessor 2100 may implement multi-core hardware circuitry such as a CPU, a DSP, a GPU, an XPU, etc. Although it may include any number of example cores 2102 (e.g., 1 core), the microprocessor 2100 of this example is a multi-core semiconductor device including N cores. The cores 2102 of the microprocessor 2100 may operate independently or may cooperate to execute machine readable instructions. For example, machine code corresponding to a firmware program, an embedded software program, or a software program may be executed by one of the cores 2102 or may be executed by multiple ones of the cores 2102 at the same or different times. In some examples, the machine code corresponding to the firmware program, the embedded software program, or the software program is split into threads and executed in parallel by two or more of the cores 2102. The software program may correspond to a portion or all of the machine readable instructions and/or operations represented by the flowcharts of FIGS. 16, 17, 18 and/or 19.

The cores 2102 may communicate by an example bus 2104. In some examples, the bus 2104 may implement a communication bus to effectuate communication associated with one(s) of the cores 2102. For example, the bus 2104 may implement at least one of an Inter-Integrated Circuit (I2C) bus, a Serial Peripheral Interface (SPI) bus, a PCI bus, or a PCIe bus. Additionally or alternatively, the bus 2104 may implement any other type of computing or electrical bus. The cores 2102 may obtain data, instructions, and/or signals from one or more external devices by example interface circuitry 2106. The cores 2102 may output data, instructions, and/or signals to the one or more external devices by the interface circuitry 2106. Although the cores 2102 of this example include example local memory 2120 (e.g., Level 1 (L1) cache that may be split into an L1 data cache and an L1 instruction cache), the microprocessor 2100 also includes example shared memory 2110 that may be shared by the cores (e.g., Level 2 (L2_cache)) for high-speed access to data and/or instructions. Data and/or instructions may be transferred (e.g., shared) by writing to and/or reading from the shared memory 2110. The local memory 2120 of each of the cores 2102 and the shared memory 2110 may be part of a hierarchy of storage devices including multiple levels of cache memory and the main memory (e.g., the main memory 2014, 2016 of FIG. 20). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 2102 may be referred to as a CPU, DSP, GPU, etc., or any other type of hardware circuitry. Each core 2102 includes control unit circuitry 2114, arithmetic and logic (AL) circuitry (sometimes referred to as an ALU) 2116, a plurality of registers 2118, the L1 cache 2120, and an example bus 2122. Other structures may be present. For example, each core 2102 may include vector unit circuitry, single instruction multiple data (SIMD) unit circuitry, load/store unit (LSU) circuitry, branch/jump unit circuitry, floating-point unit (FPU) circuitry, etc. The control unit circuitry 2114 includes semiconductor-based circuits structured to control (e.g., coordinate) data movement within the corresponding core 2102. The AL circuitry 2116 includes semiconductor-based circuits structured to perform one or more mathematic and/or logic operations on the data within the corresponding core 2102. The AL circuitry 2116 of some examples performs integer based operations. In other examples, the AL circuitry 2116 also performs floating point operations. In yet other examples, the AL circuitry 2116 may include first AL circuitry that performs integer based operations and second AL circuitry that performs floating point operations. In some examples, the AL circuitry 2116 may be referred to as an Arithmetic Logic Unit (ALU). The registers 2118 are semiconductor-based structures to store data and/or instructions such as results of one or more of the operations performed by the AL circuitry 2116 of the corresponding core 2102. For example, the registers 2118 may include vector register(s), SIMD register(s), general purpose register(s), flag register(s), segment register(s), machine specific register(s), instruction pointer register(s), control register(s), debug register(s), memory management register(s), machine check register(s), etc. The registers 2118 may be arranged in a bank as shown in FIG. 21. Alternatively, the registers 2118 may be organized in any other arrangement, format, or structure including distributed throughout the core 2102 to shorten access time. The bus 2120 may implement at least one of an I2C bus, a SPI bus, a PCI bus, or a PCIe bus.

Figure 22:
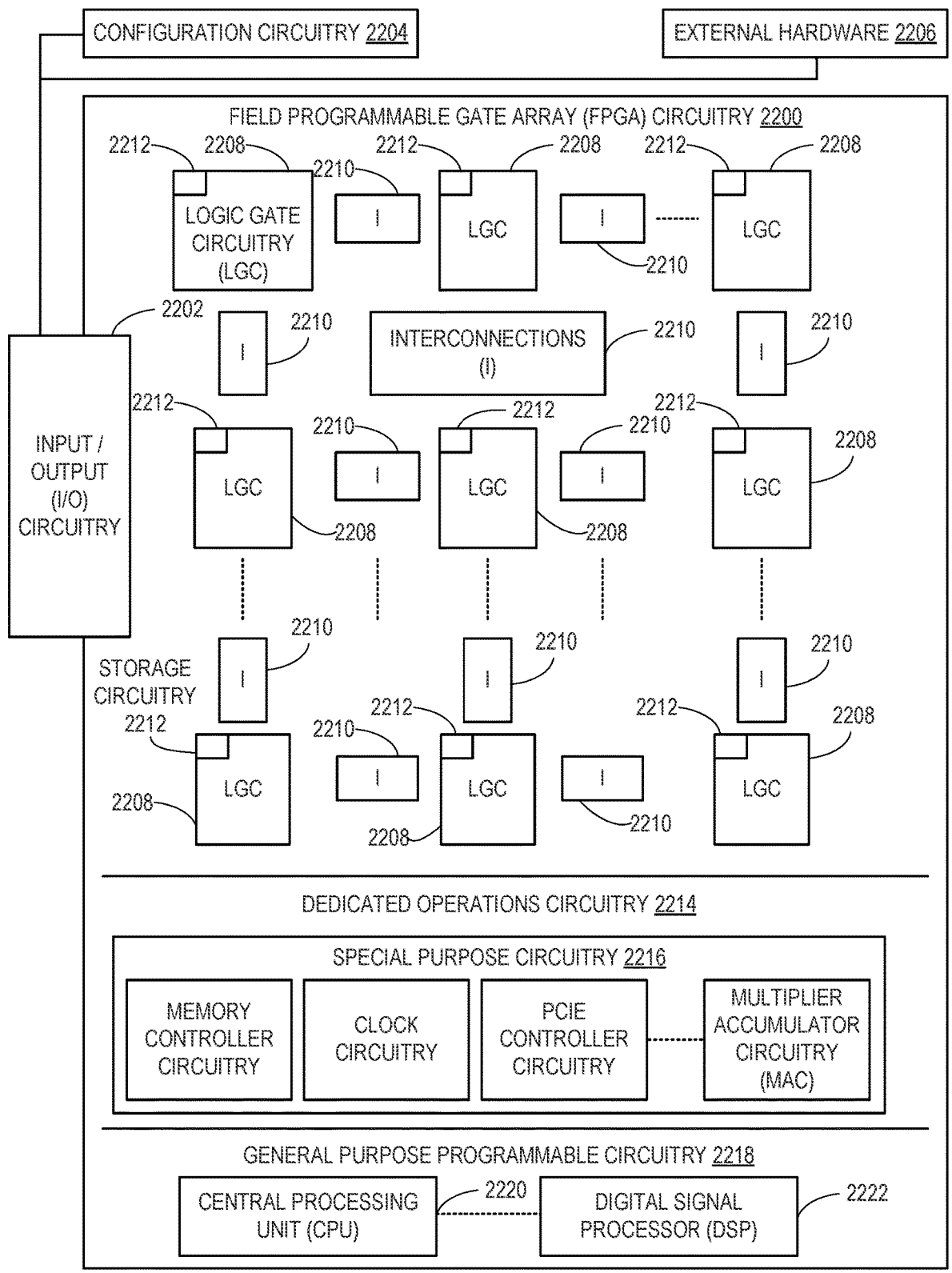
FIG. 22 is a block diagram of another example implementation of the processor circuitry of FIG. 20.

Each core 2102 and/or, more generally, the microprocessor 2100 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 2100 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry FIG. 22 is a block diagram of another example implementation of the processor circuitry 2012 of FIG. 20. In this example, the processor circuitry 2012 is implemented by FPGA circuitry 2200. The FPGA circuitry 2200 can be used, for example, to perform operations that could otherwise be performed by the example microprocessor 2100 of FIG. 21 executing corresponding machine readable instructions. However, once configured, the FPGA circuitry 2200 instantiates the machine readable instructions in hardware and, thus, can often execute the operations faster than they could be performed by a general purpose microprocessor executing the corresponding software.

More specifically, in contrast to the microprocessor 2100 of FIG. 21 described above (which is a general purpose device that may be programmed to execute some or all of the machine readable instructions represented by the flowcharts of FIGS. 16, 17, 18 and/or 19 but whose interconnections and logic circuitry are fixed once fabricated), the FPGA circuitry 2200 of the example of FIG. 22 includes interconnections and logic circuitry that may be configured and/or interconnected in different ways after fabrication to instantiate, for example, some or all of the machine readable instructions represented by the flowcharts of FIGS. 16, 17, 18 and/or 19. In particular, the FPGA 2200 may be thought of as an array of logic gates, interconnections, and switches. The switches can be programmed to change how the logic gates are interconnected by the interconnections, effectively forming one or more dedicated logic circuits (unless and until the FPGA circuitry 2200 is reprogrammed). The configured logic circuits enable the logic gates to cooperate in different ways to perform different operations on data received by input circuitry. Those operations may correspond to some or all of the software represented by the flowcharts of FIGS. 16, 17, 18 and/or 19. As such, the FPGA circuitry 2200 may be structured to effectively instantiate some or all of the machine readable instructions of the flowcharts of FIGS. 16, 17, 18 and/or 19 as dedicated logic circuits to perform the operations corresponding to those software instructions in a dedicated manner analogous to an ASIC. Therefore, the FPGA circuitry 2200 may perform the operations corresponding to the some or all of the machine readable instructions of FIGS. 16, 17, 18 and/or 19 faster than the general purpose microprocessor can execute the same.

In the example of FIG. 22, the FPGA circuitry 2200 is structured to be programmed (and/or reprogrammed one or more times) by an end user by a hardware description language (HDL) such as Verilog. The FPGA circuitry 2200 of FIG. 22, includes example input/output (I/O) circuitry 2202 to obtain and/or output data to/from example configuration circuitry 2204 and/or external hardware (e.g., external hardware circuitry) 2206. For example, the configuration circuitry 2204 may implement interface circuitry that may obtain machine readable instructions to configure the FPGA circuitry 2200, or portion(s) thereof. In some such examples, the configuration circuitry 2204 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 2206 may implement the microprocessor 2100 of FIG. 21. The FPGA circuitry 2200 also includes an array of example logic gate circuitry 2208, a plurality of example configurable interconnections 2210, and example storage circuitry 2212. The logic gate circuitry 2208 and interconnections 2210 are configurable to instantiate one or more operations that may correspond to at least some of the machine readable instructions of FIGS. 16, 17, 18 and/or 19, and/or other desired operations. The logic gate circuitry 2208 shown in FIG. 22 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 2208 to enable configuration of the electrical structures and/or the logic gates to form circuits to perform desired operations. The logic gate circuitry 2208 may include other electrical structures such as look-up tables (LUTs), registers (e.g., flip-flops or latches), multiplexers, etc.

The interconnections 2210 of the illustrated example are conductive pathways, traces, vias, or the like that may include electrically controllable switches (e.g., transistors)

whose state can be changed by programming (e.g., using an HDL instruction language) to activate or deactivate one or more connections between one or more of the logic gate circuitry 2208 to program desired logic circuits.

The storage circuitry 2212 of the illustrated example is structured to store result(s) of the one or more of the operations performed by corresponding logic gates. The storage circuitry 2212 may be implemented by registers or the like. In the illustrated example, the storage circuitry 2212 is distributed amongst the logic gate circuitry 2208 to facilitate access and increase execution speed.

The example FPGA circuitry 2200 of FIG. 22 also includes example Dedicated Operations Circuitry 2214. In this example, the Dedicated Operations Circuitry 2214 includes special purpose circuitry 2216 that may be invoked to implement commonly used functions to avoid the need to program those functions in the field. Examples of such special purpose circuitry 2216 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 2200 may also include example general purpose programmable circuitry 2218 such as an example CPU 2220 and/or an example DSP 2222. Other general purpose programmable circuitry 2218 may additionally or alternatively be present such as a GPU, an XPU, etc., that can be programmed to perform other operations.

Although FIGS. 21 and 22 illustrate two example implementations of the processor circuitry 2012 of FIG. 20, many other approaches are contemplated. For example, as mentioned above, modern FPGA circuitry may include an on-board CPU, such as one or more of the example CPU 2220 of FIG. 22. Therefore, the processor circuitry 2012 of FIG. 20 may additionally be implemented by combining the example microprocessor 2100 of FIG. 21 and the example FPGA circuitry 2200 of FIG. 22. In some such hybrid examples, a first portion of the machine readable instructions represented by the flowcharts of FIGS. 16, 17, 18 and/or 19 may be executed by one or more of the cores 2102 of FIG. 21 and a second portion of the machine readable instructions represented by the flowcharts of FIGS. 16, 17, 18 and/or 19 may be executed by the FPGA circuitry 2200 of FIG. 22.

In some examples, the processor circuitry 2012 of FIG. 20 may be in one or more packages. For example, the processor circuitry 2100 of FIG. 21 and/or the FPGA circuitry 2200 of FIG. 22 may be in one or more packages. In some examples, an XPU may be implemented by the processor circuitry 2012 of FIG. 20, which may be in one or more packages. For example, the XPU may include a CPU in one package, a DSP in another package, a GPU in yet another package, and an FPGA in still yet another package.

Figure 23:
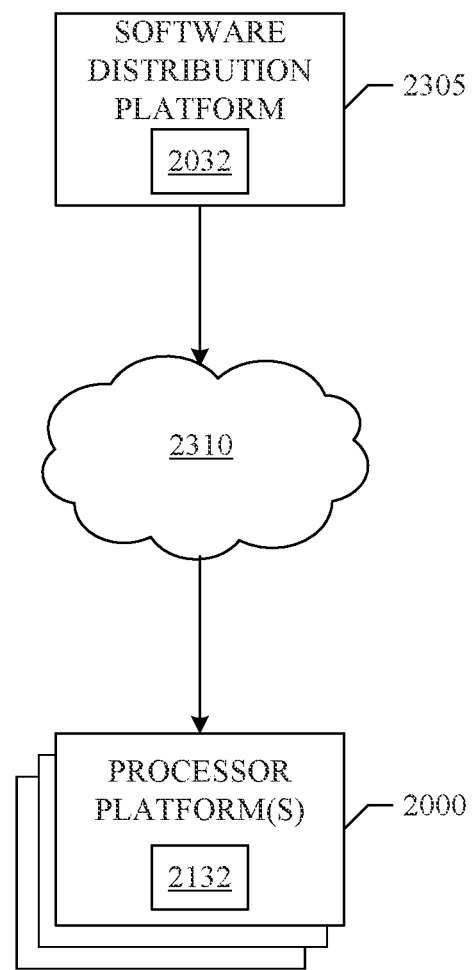
FIG. 23 is a block diagram of an example software distribution platform (e.g., one or more servers) to distribute software (e.g., software corresponding to the example machine readable instructions of FIGS. 16, 17, 18 and/or 19) to client devices associated with end users and/or consumers (e.g., for license, sale and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 2305 to distribute software such as the example machine readable instructions 2032 of FIG. 20 to hardware devices owned and/or operated by third parties is illustrated in FIG. 23. The example software distribution platform 2305 may be implemented by any computer server, data facility, cloud service, etc., capable of storing and transmitting software to other computing devices. The third parties may be customers of the entity owning and/or operating the software distribution platform 2305. For example, the entity that owns and/or operates the software distribution platform 2305 may be a developer, a seller, and/or a licensor of software such as the example machine readable instructions 2032 of FIG. 20. The third parties may be consumers, users, retailers, OEMs, etc., who purchase and/or license the software for use and/or re-sale and/or sub-licensing. In the illustrated example, the software distribution platform 2305 includes one or more servers and one or more storage devices. The storage devices store the machine readable instructions 2032, which may correspond to the example machine readable instructions of FIGS. 16, 17, 18 and/or 19, as described above. The one or more servers of the example software distribution platform 2305 are in communication with a network 2310, which may correspond to any one or more of the Internet and/or the example network 2026 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 2032 from the software distribution platform 2305. For example, the software, which may correspond to the example machine readable instructions of FIGS. 16, 17, 18 and/or 19, may be downloaded to the example processor platform 2000, which is to execute the machine readable instructions 2032 to implement the compiler system 100 and/or the compute system 200. In some examples, one or more servers of the software distribution platform 2305 periodically offer, transmit, and/or force updates to the software (e.g., the example machine readable instructions 2032 of FIG. 20) to ensure improvements, patches, updates, etc., are distributed and applied to the software at the end user devices.

From the foregoing, it will be appreciated that example systems, methods, apparatus, and articles of manufacture have been disclosed that perform automatic compiler optimization to enable streaming-store generation for unaligned contiguous write access. The disclosed systems, methods, apparatus, and articles of manufacture improve the efficiency of using a computing device by identifying contiguous stores in a source-code loop and automatically transforming an unaligned store into a write to an intermediate cache buffer followed by subsequent writes to aligned memory locations from the buffer utilizing non-temporal streaming-store instructions. The use of such non-temporal streaming-store instructions reduces memory bandwidth consumption by eliminating the need for read for ownership transactions used by conventional store instructions. The disclosed systems, methods, apparatus, and articles of manufacture are accordingly directed to one or more improvement(s) in the operation of a machine such as a computer or other electronic and/or mechanical device.

Example methods, apparatus, systems, and articles of manufacture to that perform automatic compiler optimization to enable streaming-store generation for unaligned contiguous write access are disclosed herein. Further examples and combinations thereof include the following:

Example 1 includes an apparatus to compile source program code, the apparatus comprising instructions in the apparatus, and processor circuitry to execute the instructions to at least mark a store instruction in the source program code as a transformation candidate when the store instruction is associated with a group of memory accesses that are unaligned with respect to a size of a cache line in a cache, and transform the store instruction that is marked as the transformation candidate to form transformed program code when a non-temporal property is satisfied, the transformed program code to replace the store instruction with (i) a write to a buffer in the cache and (ii) a streaming-store instruction that is to write contents of the buffer to memory.

Example 2 includes the apparatus of example 1, wherein the store instruction is a vectorized store instruction.

Example 3 includes the apparatus of example 1 or 2, wherein the transformed program code is to include a memory fence that follows the streaming-store instruction.

Example 4 includes the apparatus of any one of examples 1 to 3, wherein the streaming-store instruction does not perform a read for ownership check before writing the contents of the buffer to the memory.

Example 5 includes the apparatus of any one of examples 1 to 4, wherein the processor circuitry is to determine whether the non-temporal property is satisfied based on a trip-count of a program loop including the store instruction.

Example 6 includes the apparatus of any one of examples 1 to 5, wherein the buffer is a first buffer, and the transformed program code includes an auxiliary structure to pass information to a library function, the auxiliary structure to include a second buffer to contain partial cache-line data, a count of elements included in the second buffer, a misalignment associated with a destination of the store instruction, and a pointer to the destination of the store instruction.

Example 7 includes the apparatus of any one of examples 1 to 5, wherein the store instruction is associated with a program loop, the memory accesses are associated with an array, the transformed program code includes an alignment instruction to align a portion of the memory accesses with respect to the size of the cache line, and the write to the buffer is to store partial cache line data from a previous loop iteration that is to be stored in a next loop iteration.

Example 8 includes at least one non-transitory computer readable medium comprising computer readable instructions that, when executed, cause at least one processor to at least mark a store instruction in source program code as a transformation candidate when the store instruction is associated with a group of memory accesses that are unaligned with respect to a size of a cache line in a cache, and transform the store instruction that is marked as the transformation candidate to form transformed program code when a non-temporal property is satisfied, the transformed program code to replace the store instruction with (i) a write to a buffer in the cache and (ii) a streaming-store instruction that is to write contents of the buffer to memory.

Example 9 includes the at least one non-transitory computer readable medium of example 8, wherein the store instruction is a vectorized store instruction.

Example 10 includes the at least one non-transitory computer readable medium of example 8 or 9, wherein the transformed program code is to include a memory fence that follows the streaming-store instruction.

Example 11 includes the at least one non-transitory computer readable medium of any one of examples 8 to 10, wherein the streaming-store instruction does not perform a read for ownership check before writing the contents of the buffer to the memory.

Example 12 includes the at least one non-transitory computer readable medium of any one of examples 8 to 11, wherein the instructions cause the at least one processor to determine whether the non-temporal property is satisfied based on a trip-count of a program loop including the store instruction.

Example 13 includes the at least one non-transitory computer readable medium of any one of examples 8 to 12, wherein the buffer is a first buffer, and the transformed program code includes an auxiliary structure to pass information to a library function, the auxiliary structure to include a second buffer to contain partial cache-line data, a count of elements included in the second buffer, a misalignment associated with a destination of the store instruction, and a pointer to the destination of the store instruction.

Example 14 includes the at least one non-transitory computer readable medium of any one of examples 8 to 12, wherein the store instruction is associated with a program loop, the memory accesses are associated with an array, the transformed program code includes an alignment instruction to align a portion of the memory accesses with respect to the size of the cache line, and the write to the buffer is to store partial cache line data from a previous loop iteration that is to be stored in a next loop iteration.

Example 15 includes a method to compile source program code, the method comprising marking, by executing an instruction with at least one processor, a store instruction in the source program code as a transformation candidate when the store instruction is associated with a group of memory accesses that are unaligned with respect to a size of a cache line in a cache, and transforming, by executing an instruction with at least one processor, the store instruction that is marked as the transformation candidate to form transformed program code when a non-temporal property is satisfied, the transformed program code to replace the store instruction with (i) a write to a buffer in the cache and (ii) a streaming-store instruction that is to write contents of the buffer to memory.

Example 16 includes the method of example 15, wherein the store instruction is a vectorized store instruction.

Example 17 includes the method of example 15 or 16, wherein the transformed program code is to include a memory fence that follows the streaming-store instruction.

Example 18 includes the method of any one of examples 15 to 17, wherein the streaming-store instruction does not perform a read for ownership check before writing the contents of the buffer to the memory.

Example 19 includes the method of any one of examples 15 to 18, and further includes determining whether the non-temporal property is satisfied based on a trip-count of a program loop including the store instruction.

Example 20 includes the method of any one of examples 15 to 19, wherein the buffer is a first buffer, and the transformed program code includes an auxiliary structure to pass information to a library function, the auxiliary structure to include a second buffer to contain partial cache-line data, a count of elements included in the second buffer, a misalignment associated with a destination of the store instruction, and a pointer to the destination of the store instruction.

Example 21 includes the method of any one of examples 15 to 19, wherein the store instruction is associated with a program loop, the memory accesses are associated with an array, the transformed program code includes an alignment instruction to align a portion of the memory accesses with respect to the size of the cache line, and the write to the buffer is to store partial cache line data from a previous loop iteration that is to be stored in a next loop iteration.

Example 22 includes a system to compile source program code, the system comprising means for marking a store instruction in the source program code as a transformation candidate when the store instruction is associated with a group of memory accesses that are unaligned with respect to a size of a cache line in a cache, and means for transforming the store instruction that is marked as the transformation candidate to form transformed program code when a non-temporal property is satisfied, the transformed program code to replace the store instruction with (i) a write to a buffer in the cache and (ii) a streaming-store instruction that is to write contents of the buffer to memory.

Example 23 includes the system of example 22, wherein the store instruction is a vectorized store instruction.

Example 24 includes the system of example 22 or 23, wherein the transformed program code is to include a memory fence that follows the streaming-store instruction.

Example 25 includes the system of any one of examples 22 to 24, wherein the streaming-store instruction does not perform a read for ownership check before writing the contents of the buffer to the memory.

Example 26 includes the system of any one of examples 22 to 25, wherein the means for transforming is to determine whether the non-temporal property is satisfied based on a trip-count of a program loop including the store instruction.

Example 27 includes the system of any one of examples 22 to 26, wherein the buffer is a first buffer, and the transformed program code includes an auxiliary structure to pass information to a library function, the auxiliary structure to include a second buffer to contain partial cache-line data, a count of elements included in the second buffer, a misalignment associated with a destination of the store instruction, and a pointer to the destination of the store instruction.

Example 28 includes the system of any one of examples 22 to 26, wherein the store instruction is associated with a program loop, the memory accesses are associated with an array, the transformed program code includes an alignment instruction to align a portion of the memory accesses with respect to the size of the cache line, and the write to the buffer is to store partial cache line data from a previous loop iteration that is to be stored in a next loop iteration.

Although certain example systems, methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus to compile source program code, the apparatus comprising:
   instructions in the apparatus; and
   processor circuitry to execute the instructions to at least:
      mark a store instruction in the source program code as a transformation candidate when the store instruction is associated with a group of memory accesses that are unaligned with respect to a size of a cache line in a cache; and
      transform the store instruction that is marked as the transformation candidate to form transformed program code when a non-temporal property is satisfied, the transformed program code to replace the store instruction with (i) a write to a buffer in the cache and (ii) a streaming-store instruction that is to write contents of the buffer to memory.

2. The apparatus of claim 1, wherein the store instruction is a vectorized store instruction.

3. The apparatus of claim 1, wherein the transformed program code is to include a memory fence that follows the streaming-store instruction.

4. The apparatus of claim 1, wherein the streaming-store instruction does not perform a read for ownership check before writing the contents of the buffer to the memory.

5. The apparatus of claim 1, wherein the processor circuitry is to determine whether the non-temporal property is satisfied based on a trip-count of a program loop including the store instruction.

6. The apparatus of claim 1, wherein the buffer is a first buffer, and the transformed program code includes an auxiliary structure to pass information to a library function, the auxiliary structure to include a second buffer to contain partial cache-line data, a count of elements included in the second buffer, a misalignment associated with a destination of the store instruction, and a pointer to the destination of the store instruction.

7. The apparatus of claim 1, wherein the store instruction is associated with a program loop, the memory accesses are associated with an array, the transformed program code includes an alignment instruction to align a portion of the memory accesses with respect to the size of the cache line, and the write to the buffer is to store partial cache line data from a previous loop iteration that is to be stored in a next loop iteration.

8. At least one non-transitory computer readable medium comprising computer readable instructions that, when executed, cause at least one processor to at least:
   mark a store instruction in source program code as a transformation candidate when the store instruction is associated with a group of memory accesses that are unaligned with respect to a size of a cache line in a cache; and
   transform the store instruction that is marked as the transformation candidate to form transformed program code when a non-temporal property is satisfied, the transformed program code to replace the store instruction with (i) a write to a buffer in the cache and (ii) a streaming-store instruction that is to write contents of the buffer to memory.

9. The at least one non-transitory computer readable medium of claim 8, wherein the store instruction is a vectorized store instruction.

10. The at least one non-transitory computer readable medium of claim 8, wherein the transformed program code is to include a memory fence that follows the streaming-store instruction.

11. The at least one non-transitory computer readable medium of claim 8, wherein the streaming-store instruction does not perform a read for ownership check before writing the contents of the buffer to the memory.

12. The at least one non-transitory computer readable medium of claim 8, wherein the instructions cause the at least one processor to determine whether the non-temporal property is satisfied based on a trip-count of a program loop including the store instruction.

13. The at least one non-transitory computer readable medium of claim 8, wherein the buffer is a first buffer, and the transformed program code includes an auxiliary structure to pass information to a library function, the auxiliary structure to include a second buffer to contain partial cache-line data, a count of elements included in the second buffer, a misalignment associated with a destination of the store instruction, and a pointer to the destination of the store instruction.

14. The at least one non-transitory computer readable medium of claim 8, wherein the store instruction is associated with a program loop, the memory accesses are associated with an array, the transformed program code includes an alignment instruction to align a portion of the memory accesses with respect to the size of the cache line, and the write to the buffer is to store partial cache line data from a previous loop iteration that is to be stored in a next loop iteration.

15. A method to compile source program code, the method comprising:
    marking, by executing an instruction with at least one processor, a store instruction in the source program code as a transformation candidate when the store instruction is associated with a group of memory accesses that are unaligned with respect to a size of a cache line in a cache; and
    transforming, by executing an instruction with at least one processor, the store instruction that is marked as the transformation candidate to form transformed program code when a non-temporal property is satisfied, the transformed program code to replace the store instruction with (i) a write to a buffer in the cache and (ii) a streaming-store instruction that is to write contents of the buffer to memory.

16. The method of claim 15, wherein the store instruction is a vectorized store instruction.

17. The method of claim 15, wherein the transformed program code is to include a memory fence that follows the streaming-store instruction.

18. The method of claim 15, wherein the streaming-store instruction does not perform a read for ownership check before writing the contents of the buffer to the memory.

19. The method of claim 15, further including determining whether the non-temporal property is satisfied based on a trip-count of a program loop including the store instruction.

20. The method of claim 15, wherein the buffer is a first buffer, and the transformed program code includes an auxiliary structure to pass information to a library function, the auxiliary structure to include a second buffer to contain partial cache-line data, a count of elements included in the second buffer, a misalignment associated with a destination of the store instruction, and a pointer to the destination of the store instruction.

21. The method of claim 15, wherein the store instruction is associated with a program loop, the memory accesses are associated with an array, the transformed program code includes an alignment instruction to align a portion of the memory accesses with respect to the size of the cache line, and the write to the buffer is to store partial cache line data from a previous loop iteration that is to be stored in a next loop iteration.

22. A system to compile source program code, the system comprising:
    means for marking a store instruction in the source program code as a transformation candidate when the store instruction is associated with a group of memory accesses that are unaligned with respect to a size of a cache line in a cache; and
    means for transforming the store instruction that is marked as the transformation candidate to form transformed program code when a non-temporal property is satisfied, the transformed program code to replace the store instruction with (i) a write to a buffer in the cache and (ii) a streaming-store instruction that is to write contents of the buffer to memory.

23. The system of claim 22, wherein the store instruction is a vectorized store instruction.

24. The system of claim 22, wherein the transformed program code is to include a memory fence that follows the streaming-store instruction.

25. The system of claim 22, wherein the streaming-store instruction does not perform a read for ownership check before writing the contents of the buffer to the memory.

* * * * *